United States Patent
Hirata et al.

(10) Patent No.: US 10,882,005 B2
(45) Date of Patent: Jan. 5, 2021

(54) HYDROGEN GAS PRODUCTION DEVICE AND HYDROGEN GAS PRODUCTION METHOD

(71) Applicant: Kagoshima University, Kagoshima (JP)

(72) Inventors: Yoshihiro Hirata, Kagoshima (JP); Taro Shimonosono, Kagoshima (JP); Hikari Imada, Kagoshima (JP)

(73) Assignee: Kagoshima University, Kagoshima (JP)

( * ) Notice: Subject to any disclaimer, the term of this patent is extended or adjusted under 35 U.S.C. 154(b) by 303 days.

(21) Appl. No.: 15/748,069

(22) PCT Filed: Jul. 25, 2016

(86) PCT No.: PCT/JP2016/071726
§ 371 (c)(1),
(2) Date: Jan. 26, 2018

(87) PCT Pub. No.: WO2017/018378
PCT Pub. Date: Feb. 2, 2017

(65) Prior Publication Data
US 2018/0207578 A1    Jul. 26, 2018

(30) Foreign Application Priority Data
Jul. 28, 2015 (JP) .................. 2015-148955

(51) Int. Cl.
*B01D 53/22* (2006.01)
*C01B 3/50* (2006.01)
(Continued)

(52) U.S. Cl.
CPC ......... *B01D 53/22* (2013.01); *B01D 67/0041* (2013.01); *B01D 69/02* (2013.01);
(Continued)

(58) Field of Classification Search
CPC .............. B01D 71/021; B01D 69/02; B01D 2053/221; B01D 53/22; B01D 2257/504;
(Continued)

(56) References Cited

U.S. PATENT DOCUMENTS 6,632,849 B1 * 10/2003 Yao .................... B01D 39/2055
264/43
6,919,062 B1 * 7/2005 Vasileiadis .......... C07C 29/1518
423/437.1
(Continued)

FOREIGN PATENT DOCUMENTS

| JP | S59-059223 | 4/1984 |
| JP | 2004-181456 | 7/2004 |
| JP | 2005-270887 | 10/2005 |

OTHER PUBLICATIONS

Gotanda K et al. "Separation of H2/CO2 mixed gas through porous alumina compact," The 31st International Korea-Japan Seminar on Ceramics, NA-P02, p. 296, 2014.
(Continued)

*Primary Examiner* — Anthony R Shumate
(74) *Attorney, Agent, or Firm* — K&L Gates LLP; Louis C. Cullman; Georgia N. Kefallinos

(57) ABSTRACT

A hydrogen gas producing apparatus includes a porous body (100) and a mixed gas source (300). The porous body (100) is permeable to hydrogen gas and carbon dioxide gas, and has a property of being more permeable to hydrogen gas than carbon dioxide gas. The mixed gas source (300) causes a mixed gas including carbon dioxide gas and hydrogen gas to flow into the porous body (100) under a condition that a pressure gradient represented by $(P_1-P_2)/L$ is below 50 MPa/m, where L represents the length of the porous body (100) in a direction in which the mixed gas permeates; $P_1$ represents an inflow pressure of the mixed gas into the
(Continued)

porous body (100); and $P_2$ represents an outflow pressure thereof from the porous body (100).

6 Claims, 22 Drawing Sheets

(51) Int. Cl.

| | |
|---|---|
| *B01D 71/02* | (2006.01) |
| *C04B 35/575* | (2006.01) |
| *C04B 37/00* | (2006.01) |
| *C04B 35/111* | (2006.01) |
| *B01D 67/00* | (2006.01) |
| *C04B 35/486* | (2006.01) |
| *B01D 69/02* | (2006.01) |
| *C01B 3/56* | (2006.01) |
| *C04B 35/10* | (2006.01) |
| *C04B 35/48* | (2006.01) |
| *C04B 35/565* | (2006.01) |
| *C04B 38/00* | (2006.01) |

(52) U.S. Cl.
CPC ......... *B01D 71/021* (2013.01); *B01D 71/022* (2013.01); *B01D 71/024* (2013.01); *B01D 71/025* (2013.01); *C01B 3/501* (2013.01); *C01B 3/503* (2013.01); *C01B 3/56* (2013.01); *C04B 35/10* (2013.01); *C04B 35/111* (2013.01); *C04B 35/48* (2013.01); *C04B 35/486* (2013.01); *C04B 35/565* (2013.01); *C04B 35/575* (2013.01); *C04B 35/5755* (2013.01); *C04B 37/001* (2013.01); *C04B 38/007* (2013.01); *C04B 38/0038* (2013.01); *B01D 2053/221* (2013.01); *B01D 2256/16* (2013.01); *B01D 2257/504* (2013.01); *B01D 2325/02* (2013.01); *C01B 2203/0405* (2013.01); *C04B 2235/3217* (2013.01); *C04B 2235/3225* (2013.01); *C04B 2235/3246* (2013.01); *C04B 2235/5409* (2013.01); *C04B 2235/5445* (2013.01); *C04B 2235/5454* (2013.01); *C04B 2235/602* (2013.01); *C04B 2235/6567* (2013.01); *C04B 2235/6586* (2013.01); *C04B 2235/72* (2013.01); *C04B 2235/77* (2013.01); *C04B 2237/343* (2013.01); *C04B 2237/348* (2013.01)

(58) Field of Classification Search
CPC .............. B01D 67/0041; B01D 71/024; B01D 2256/16; B01D 71/025; B01D 2325/02; B01D 71/022; C04B 35/48; C04B 38/007; C04B 35/486; C04B 2235/3225; C04B 35/10; C04B 35/111; C04B 2235/3246; C04B 35/565; C04B 38/0038; C04B 35/575; C04B 37/001; C04B 2235/3217; C04B 35/5755; C04B 2235/5409; C04B 2235/5445; C04B 2235/602; C04B 2235/6567; C04B 2235/6586; C04B 2235/72; C04B 2235/77; C04B 2237/343; C04B 2237/348; C01B 3/501; C01B 2203/0405; C01B 3/503
See application file for complete search history.

(56) References Cited

U.S. PATENT DOCUMENTS

| | | | | |
|---|---|---|---|---|
| 2004/0107831 | A1* | 6/2004 | Graham | B01D 53/047 95/96 |
| 2004/0166385 | A1* | 8/2004 | Morse | H01M 8/04216 429/421 |
| 2006/0288677 | A1* | 12/2006 | Kaigawa | B01D 53/02 55/522 |
| 2008/0210087 | A1* | 9/2008 | Ku | B01D 53/228 95/51 |
| 2009/0192297 | A1* | 7/2009 | Yoshida | C12N 11/14 530/402 |
| 2009/0206025 | A1* | 8/2009 | Ichikawa | B01D 53/228 210/489 |
| 2014/0151288 | A1* | 6/2014 | Miller | B01D 69/10 210/497.01 |
| 2017/0001153 | A1* | 1/2017 | Ichinose | B01D 69/12 |
| 2017/0137350 | A1* | 5/2017 | Weiss | B01D 61/002 |
| 2017/0296980 | A1* | 10/2017 | Noda | B01J 20/3265 |
| 2019/0224628 | A1* | 7/2019 | Lin | B01D 67/0079 |

OTHER PUBLICATIONS

Shirasaka H et al. "Analysis of gas permeability of porous alumina powder compacts," J Asian Ceramic Societies 1(4):368-373, Dec. 5, 2013.

* cited by examiner

HYDROGEN GAS PRODUCTION DEVICE AND HYDROGEN GAS PRODUCTION METHOD

TECHNICAL FIELD

The present disclosure relates to a hydrogen gas producing apparatus and a hydrogen gas producing method.

BACKGROUND ART

Most of currently used hydrogen gases are those obtained through steam reforming of natural gases. Natural gas steam reforming is represented by the following chemical reaction equation:

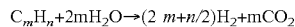

$$C_mH_n + 2mH_2O \rightarrow (2m+n/2)H_2 + mCO_2$$

After steam reforming, hydrogen gas needs to be concentrated and taken out from a mixed gas on the right side of the equation. For example, there is known a technique in which the hydrogen gas concentration is performed by passing the mixed gas through a porous body. The technique uses a fact that carbon dioxide gas is less permeable through a porous body than hydrogen gas.

Patent Literature 1 discloses an Example in which a mixed gas including hydrogen gas and carbon dioxide gas was caused to flow into a porous body with a thickness of 1 mm on conditions that inflow pressure was from 0.2 to 2 MPa and outflow pressure was 0.1 MPa (see Example 2 on page 3 of Patent Literature 1).

CITATION LIST

Patent Literature

Patent Literature 1: Unexamined Japanese Patent Application Kokai Publication No. S59-59223

SUMMARY OF INVENTION

Technical Problem

According to the above Example of Patent Literature 1, a pressure gradient defined as a value obtained by dividing a difference between an inflow pressure and an outflow pressure by a thickness of the porous body is approximately from 100 to 1900 MPa/m.

Studies by the inventors of the present disclosure showed that, under such a high pressure gradient, a hydrogen gas concentration function of the porous body cannot be fully exhibited.

The present disclosure has been made in view of the above circumstances. It is an objective of the disclosure to provide a hydrogen gas producing apparatus and a hydrogen gas producing method that enable the hydrogen gas concentration function of a porous body to be fully exhibited.

Solution to Problem

To achieve the above objective, a hydrogen gas producing apparatus according to a first aspect of the present disclosure includes a porous body that is permeable to hydrogen gas and to carbon dioxide gas and that has a property of being more permeable to hydrogen gas than to carbon dioxide gas; and a mixed gas source that causes a mixed gas including carbon dioxide gas and hydrogen gas to flow into the porous body under a condition that a pressure gradient represented by $(P_1-P_2)/L$ is below 50 MPa/m where L represents a length of the porous body in a direction in which the mixed gas permeates, $P_1$ represents an inflow pressure of the mixed gas into the porous body, and $P_2$ represents an outflow pressure from the porous body.

The mixed gas source may cause the mixed gas to flow into the porous body under a condition that the pressure gradient is 30 MPa/m or less.

The mixed gas may be caused to flow into the porous body under a temperature environment at room temperature.

The hydrogen gas producing apparatus further includes heater to heat at least one of the porous body or the mixed gas, wherein the mixed gas may be flowed into the porous body under a temperature environment heated to 200° C. or higher by the heater.

When the heater is included, the mixed gas source may cause the mixed gas to flow into the porous body under a condition that the pressure gradient is 7.5 MPa/m or less or 10 MPa/m or more.

In a cumulative pore diameter distribution of the porous body, a pore diameter (D80) at a number cumulative frequency of 80% may be 800 nm or less.

The porous body may include ceramic.

The ceramic may include one or more inorganic materials selected from an alumina material, an yttria-stabilized zirconia material, and a silicon carbide material.

A hydrogen gas producing method according to a second aspect of the present disclosure includes a step of preparing a mixed gas including carbon dioxide gas and hydrogen gas and a step of causing the mixed gas to flow into a porous body that is permeable to hydrogen gas and to carbon dioxide gas and that has a property of being more permeable to hydrogen gas than to carbon dioxide gas, under a condition that a pressure gradient represented by $(P_1-P_2)/L$ is below 50 MPa/m where L represents a length of the porous body in a direction in which the mixed gas permeates, $P_1$ represents an inflow pressure of the mixed gas into the porous body, and $P_2$ represents an outflow pressure from the porous body.

Advantageous Effects of Invention

According to the present disclosure, when the mixed gas is caused to flow into the porous body under the condition that the pressure gradient is below 50 MPa/m, the hydrogen gas concentration function of the porous body can be fully exhibited.

DESCRIPTION OF EMBODIMENTS

Hereinafter, fundamental matters to be considered will be described before description of Examples of the present disclosure.

Figure 1:
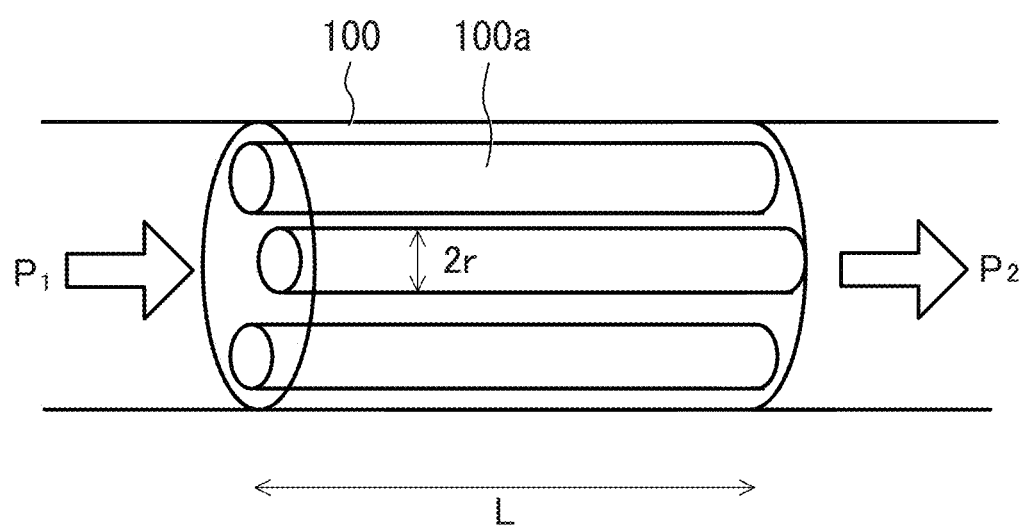
FIG. 1 is a conceptual diagram for illustrating a gas permeation mechanism in a porous body.

As depicted in FIG. 1, gas is caused to flow in from one end surface of a porous body 100. The gas flown therein permeates through the porous body 100 and flows out from another end surface of the porous body 100. Consider modeling the porous body 100 as an assembly of thin tubes 100a. A mean free path of the gas is represented by λ, and a diameter of each thin tube 100a is represented by 2r.

When a value of r/λ is, for example, five or more, a Poiseuille flow is established in which collisions between gas molecules occur more preferentially than collisions between the gas molecules and inner walls of the thin tubes 100a.

In the Poiseuille flow, a flux J(P) of the gas passing through the porous body 100 (hereinafter referred to as permeate gas flux) will be given by the following equation. Note that the permeate gas flux represents an amount of substance of a gas passing through a unit cross-sectional area per unit time, and has the dimensions of mol/(sec·m²).

[Equation 1]

$$J(P) = \frac{r^2 \varepsilon P_E}{8RT\eta} \frac{\Delta P}{L} \qquad (1)$$

Herein, ε represents a porosity of the porous body; R represents a gas constant; T represents an absolute temperature; η represents a viscosity of the gas; and L represents a length of the porous body 100 in a direction in which the gas permeates. Additionally, $\Delta P = P_1 - P_2$, where $P_1$ represents an inflow pressure of the gas into the porous body 100, and $P_2$ represents an outflow pressure of the gas from the porous body 100. In addition, $P_E = (P_1 + P_2)/2$.

On the other hand, when the value of r/λ is, for example, one or less, a Knudsen flow is established in which collisions between gas molecules and the inner walls of the thin tubes 100a occur more preferentially than collisions between the gas molecules.

In the Knudsen flow, a permeate gas flux J(K) will be given by the following equation. Herein, $C_E$ represents a mean speed of the gas molecules.

[Equation 2]

$$J(K) = \frac{2\varepsilon r c_E}{3RT} \frac{\Delta P}{L} \qquad (2)$$

Hereinafter, a physical amount represented by ΔP/L will be referred to as pressure gradient. As depicted in Equations (1) and (2), even in the case of the Poiseuille flow, theoretically, the permeate gas flux is proportional to the pressure gradient ΔP/L. Similarly, even in the case of 1<r/λ<5, the permeate gas flux is considered to be proportional to the pressure gradient ΔP/L. Specifically, a graph with pressure gradient ΔP/L on x-axis and permeate gas flux on y-axis is represented by a line that goes from the origin.

A slope of the line, specifically, a value of a proportionality coefficient that is multiplied by ΔP/L on the right side of Equation (1) or (2) varies with the kind of gas. The proportionality coefficient of hydrogen gas is larger than the proportionality coefficient of carbon dioxide gas. In other words, the porous body 100 has a property of being more permeable to hydrogen gas than to carbon dioxide gas. Thus, when the gas used is a mixed gas of hydrogen gas and carbon dioxide gas, hydrogen gas concentration can be achieved.

The hydrogen gas concentration function of the porous body 100 can be evaluated by a ratio of hydrogen gas flux to the flux of a gas flown out from the porous body 100 (hereinafter referred to as separation coefficient).

In the case of the Poiseuille flow, only the viscosity η depends on the kind of gas in Equation (1). Accordingly, when the ratio of the fluxes is taken, factors other than the viscosity η are cancelled, so that the separation coefficient is determined only by the viscosity η.

In the case of the Knudsen flow, only the mean speed $C_E$ depends on the kind of gas in Equation (1). Accordingly, when the ratio of the fluxes is taken, factors other than the mean speed $C_E$ are cancelled, so that the separation coefficient is determined only by the mean speed $C_E$.

In other words, in both of the Poiseuille flow and the Knudsen flow, theoretically, the separation coefficient does not depend on the pressure gradient ΔP/L. Similarly, even in the case of 1<r/λ<5, the separation coefficient is considered not to depend on the pressure gradient ΔP/L.

Thus, conventionally, to efficiently perform hydrogen gas concentration, the porous body 100 has been used under as high a pressure gradient as possible, as described in Patent Literature 1.

However, studies of the inventors of the present application have found that the porous body 100 can exhibit characteristics different from technical common knowledge theoretically shown by Equations (1) and (2). Hereinafter, major points of the findings will be described with reference to FIG. 2.

Figure 2:
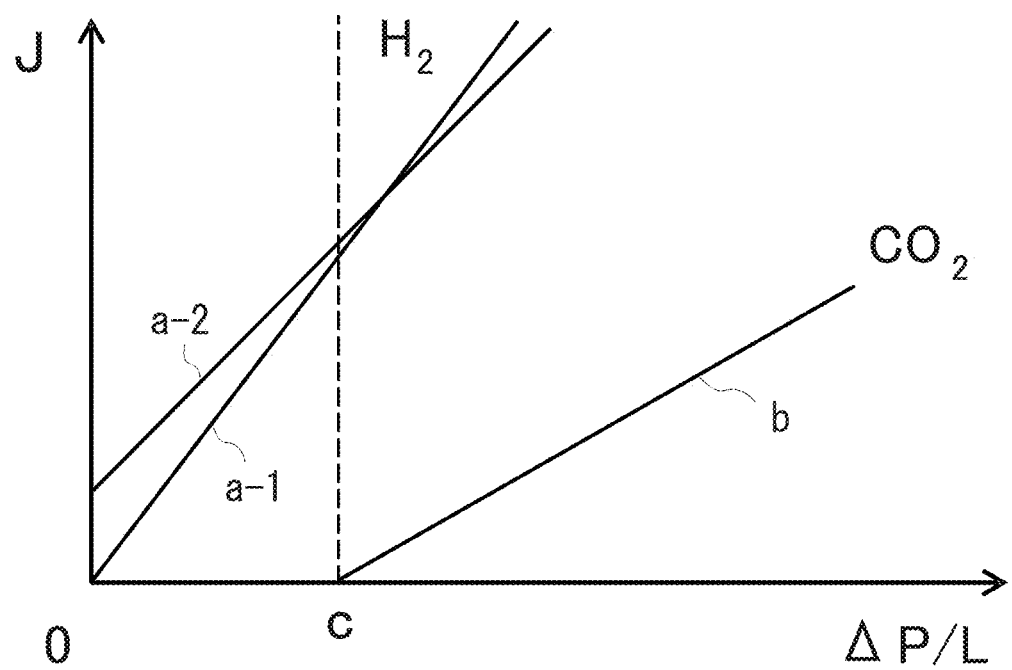
FIG. 2 is a graph schematically depicting a relationship between permeate gas flux and pressure gradient.

FIG. 2 is a graph schematically depicting a relationship between the permeate gas flux J and the pressure gradient ΔP/L. The x-axis represents the pressure gradient ΔP/L, and the y-axis represents the permeate gas flux J.

The permeate gas flux J of hydrogen gas was observed to be represented by a line going from the origin substantially theoretically, as indicated by a line a-1, or a line having a y-axis intercept, as indicated by a line a-2 (thesis: Journal of Asian Ceramic Societies, 1, 368-373 (2013)).

On the other hand, the permeate gas flux J of carbon dioxide gas was observed to be represented by a line having an x-axis intercept C without going from the origin, as indicated by a line b. In other words, carbon dioxide gas does not permeate through the porous body 100 until the pressure gradient ΔP/L reaches a certain critical value (hereinafter referred to as critical pressure gradient) C.

Based on the above observation results, the inventors of the present application conceived an idea that, near the critical pressure gradient C or under a pressure gradient equal to or less than that, hydrogen gas concentration can be performed by using not only a difference in the slope of permeate gas flux J between hydrogen gas and carbon dioxide gas but also a difference in x-axis intercept therebetween. The present disclosure has been made based on the knowledge.

Examples and Reference Examples of the present disclosure will be described below.

EXAMPLES 1 TO 3 AND REFERENCE EXAMPLES 1 AND 2

To an α-alumina powder (product name: AKP 50, manufactured by Sumitomo Chemical Co., Ltd.) having a specific surface area of 10.5 $m^2/g$, a median diameter of 310 nm, and an isoelectric point of pH 8.5 was added a dispersant liquid having a pH of 3, and the mixture was stirred for 24 hours to prepare a suspension. It is to be noted that the dispersant liquid forms an electric double layer on respective particles of the α-alumina powder to cause occurrence of electrostatic repulsion between the particles. The α-alumina powder accounts for 30% by volume of the suspension, and the dispersant liquid accounts for the rest thereof.

Next, the suspension was filtered through an upper dehydration-type filtering apparatus and made into a molded body. Furthermore, the molded body was dried at 100° C. for 24 hours, and then sintered at 800° C. for 1 hour in air to obtain an alumina porous body.

Figure 3A:
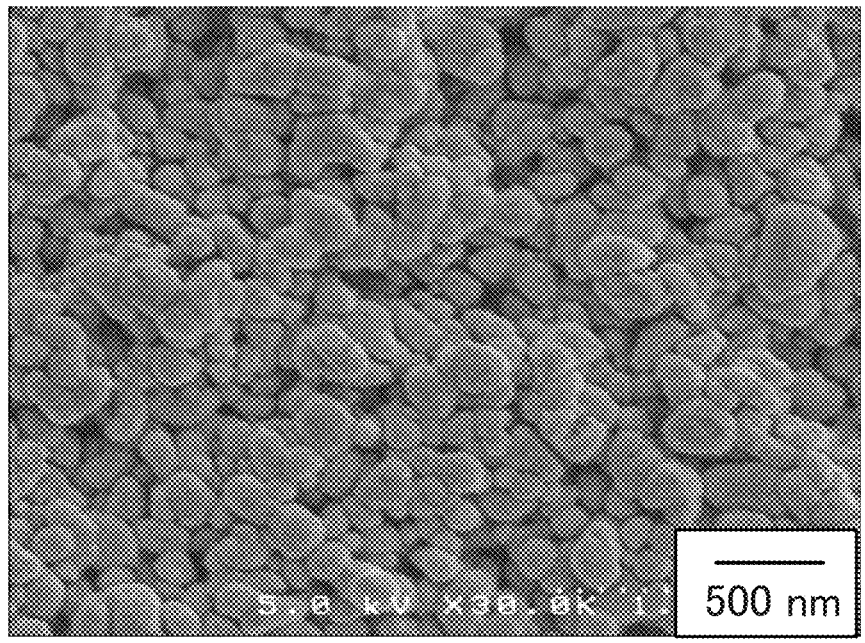
FIG. 3A is a SEM photograph of an alumina porous body.

FIG. 3A depicts a scanning electron microscopic (SEM) photograph of the obtained alumina porous body. As depicted, a porous tissue formed by adhesion between the particles of the α-alumina powder was recognized.

Figure 3B:
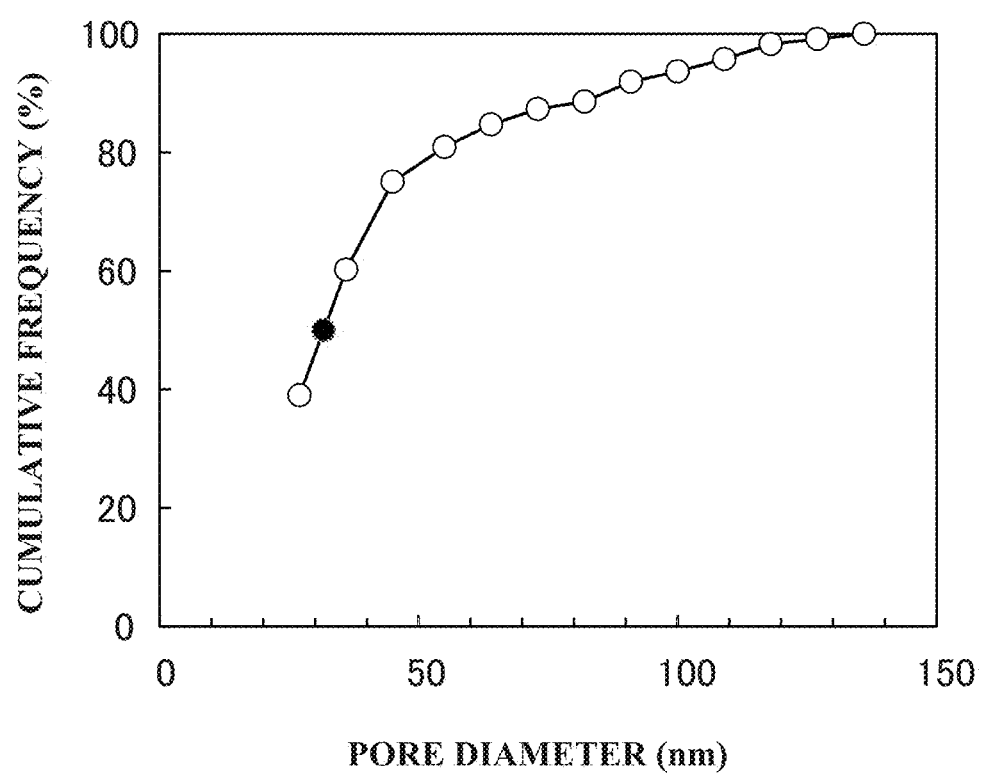
FIG. 3B is a graph depicting a cumulative pore diameter distribution of the alumina porous body.

FIG. 3B depicts a cumulative pore diameter distribution of the obtained alumina porous body. The pore diameter distribution of the porous body was measured by an intercept method using the SEM image. The maximum pore diameter thereof was 150 nm, and the median diameter (D50) thereof was 32 nm.

Additionally, the density and the like of the alumina porous body were measured by an Archimedes' method, resulting in a relative density of 62.7%, an open porosity of 36.2%, and a closed porosity of 1.1%. It is to be noted that the term "relative density" refers to a ratio of a solid portion except for pores to a total volume.

Next, using the alumina porous body, hydrogen gas concentration was performed under a temperature environment at room temperature. Note that the term "room temperature" as used herein refers to a temperature exceeding 0° C. and below 40° C. First, a hydrogen gas producing apparatus used for hydrogen gas concentration will be described.

Figure 4:
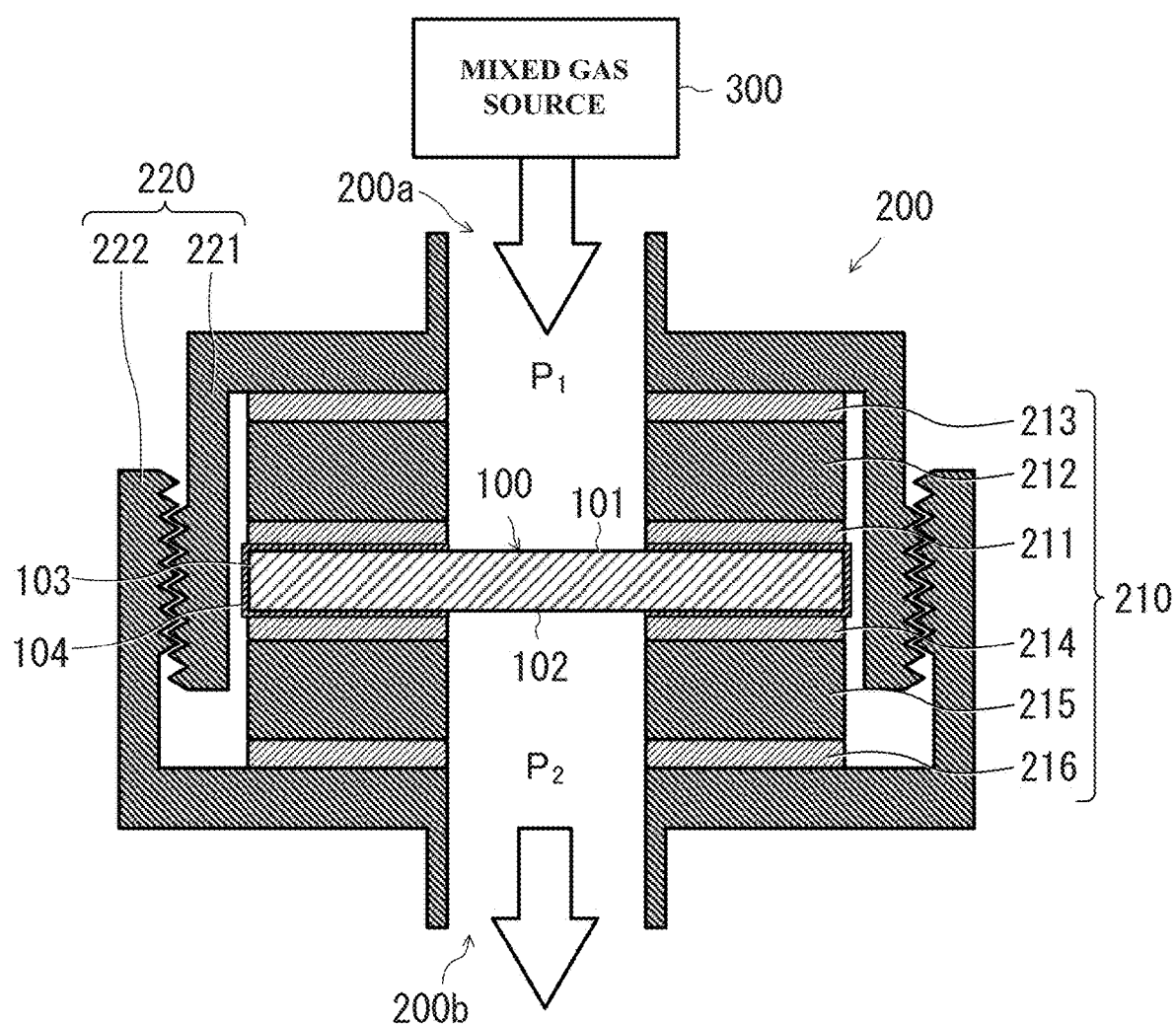
FIG. 4 is a partial cross-sectional schematic diagram of a hydrogen gas producing apparatus according to an Example.

As depicted in FIG. 4, the hydrogen gas producing apparatus includes the porous body 100, a gas flow channel 200 having a flow inlet 200a at one end thereof and a flow outlet 200b at the other end thereof and having the porous body 100 arranged thereinside, and a mixed gas source 300 that supplies a mixed gas from the flow inlet 200a of the gas flow channel 200.

The porous body 100 is formed into a substantially disk shape having a front surface with an inflow region 101 into which a mixed gas supplied from the mixed gas source 300 flows, a rear surface with an outflow region 102 from which the gas flows out, and a side surface 103 connecting the front surface and the rear surface together. The inflow region 101 is located at a substantially center of the front surface, and the outflow region 102 is located at a substantially center of the rear surface. The porous body 100 has a gas leakage preventing film 104 on a circumferential edge portion except for the inflow region 101 on the front surface, a circumferential edge portion except for the outflow region 102 on the rear surface, and on the side surface 103 over the entire circumference. The gas leakage preventing film 104 is formed by applying resin, specifically, a phenolic resin.

The gas flow channel 200 includes a jig 210 that sandwiches the circumferential edge portions of the porous body 100 having the gas leakage preventing film 104 formed thereon from both sides in a thickness direction and a holding member 220 that holds the jig 210.

The jig 210 includes a ring-shaped sealing member 211 in contact with the gas leakage preventing film 104 on the front surface of the porous body 100, a ring-shaped spacer 212 arranged on the sealing member 211, and a ring-shaped sealing member 213 arranged on the spacer 212. The jig 210 also includes a ring-shaped sealing member 214 in contact with the gas leakage preventing film 104 of the rear surface of the porous body 100, a ring-shaped spacer 215 arranged on the sealing member 214, and a ring-shaped sealing member 216 arranged on the spacer 215.

The sealing members 211, 213, 214, and 216 are made of rubber. The spacers 212 and 215 are made of metal, specifically, stainless steel. A projected region obtained by projecting the sealing member 211, the spacer 212, and the sealing member 213 on the front surface of the porous body 100 substantially overlaps with a region where the gas leakage preventing film 104 of the front surface of the porous body 100 is formed. Additionally, a projected region obtained by projecting the sealing member 214, the spacer 215, and the sealing member 216 on the rear surface of the porous body 100 substantially overlaps with a region where the gas leakage preventing film 104 of the rear surface of the porous body 100 is formed.

The holding member 220 includes a male member 221 and a female member 222 that sandwich the porous body 100 and the jig 210 in the thickness direction of the porous body 100. The male member 221 is in contact with the sealing member 213 and forms the flow inlet 200a. The female member 222 is in contact with the sealing member 216 and forms the flow outlet 200b.

The male member 221 and the female member 222 are screwed to each other. By screwing one of the male member 221 or the female member 222 with respect to the other one thereof, the one thereof can move forward and backward with respect to the other one thereof in the thickness direction of the porous body 100. Thereby, pressure for airtightly sandwiching the jig 210 can be adjusted.

Using the above-described alumina porous body as the porous body 100, a mixed gas including hydrogen gas and carbon dioxide gas was supplied from the mixed gas source 300, and a hydrogen gas concentrating ability of the porous body 100 was investigated under a temperature environment at approximately 25° C. as room temperature. Herein, "under a temperature environment at room temperature" specifically means a condition that all of the alumina porous body as the porous body 100, the gas flow channel 200, and the mixed gas to be caused to flow into the porous body 100 are at room temperature.

The level of the hydrogen gas in the mixed gas supplied from the mixed gas source 300 was variously changed. Additionally, while maintaining the outflow pressure $P_2$ of the gas in the outflow region 102 of the porous body 100 at a substantially atmospheric pressure (0.1 MPa), the inflow pressure $P_1$ of the mixed gas into the inflow region 101 of the porous body 100 was changed to various values to change the pressure gradient $\Delta P/L$ to various values. Note that the length (thickness) L of the alumina porous body in a direction in which the mixed gas permeates is 3 mm.

Under the above respective conditions, a permeate gas flux "J" defined by the following equation was measured concerning each of hydrogen gas and carbon dioxide gas.

[Equation 3]

$$J = \frac{Q}{At} = \alpha \frac{\Delta P}{L} \quad (3)$$

Herein, Q represents the number of moles of the gas having permeated through the porous body 100, and was measured by gas chromatography. A represents an area of a cross-section of the porous body 100 perpendicular to the direction in which the gas permeates. The area is equal to the areas of the inflow region 101 and the outflow region 102. t represents a time required for the gas to permeate through the porous body 100. α is referred to as permeability coefficient.

Figure 5:
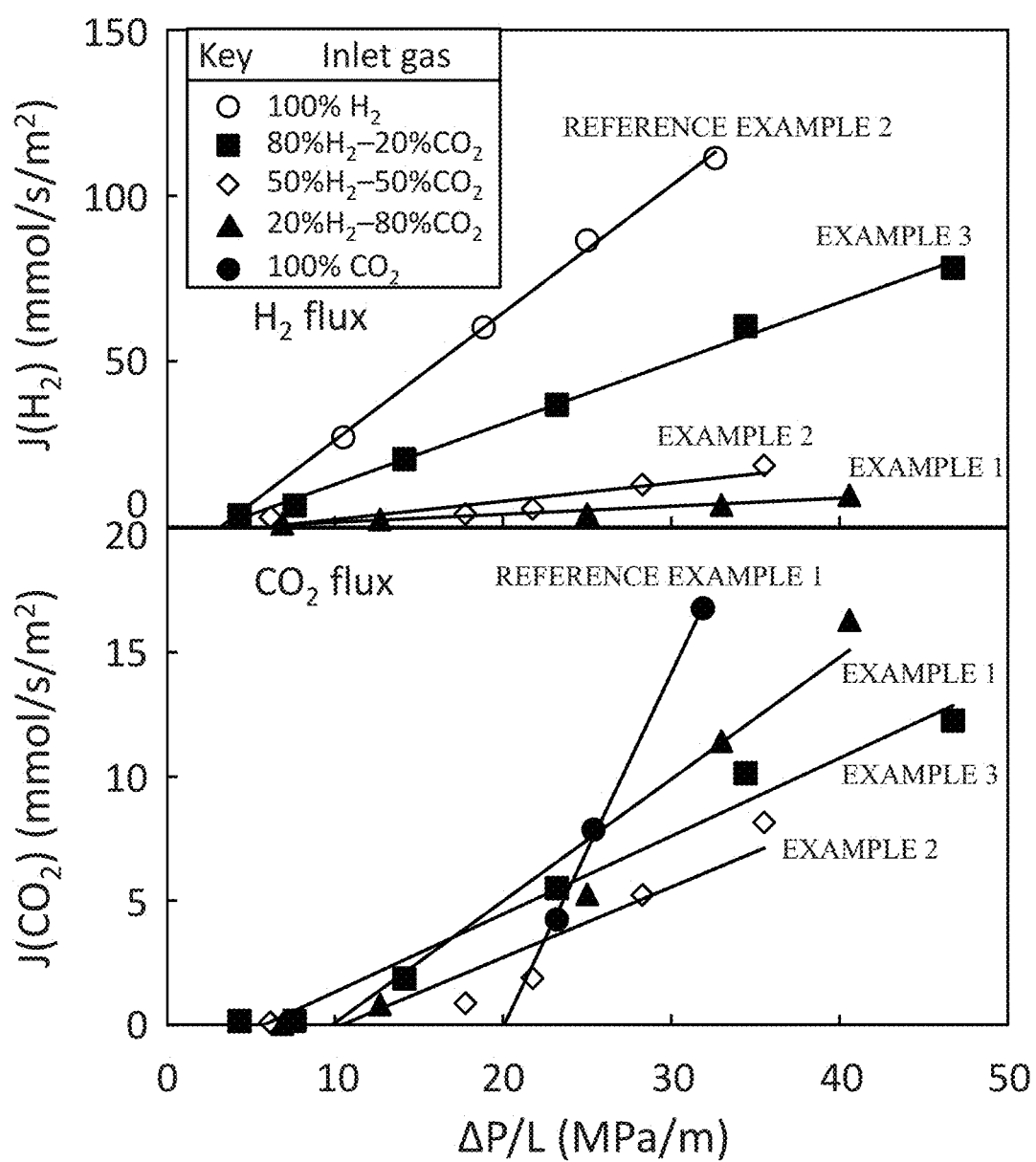
FIG. 5 is a graph depicting results of permeate gas flux measurements concerning hydrogen gas and carbon dioxide gas in a case in which hydrogen gas concentration was performed by using an alumina porous body under a temperature environment at room temperature.

FIG. 5 depicts a graph obtained by linearly approximating plots of results of permeate gas flux measurements by a least-squares method. $J(H_2)$ in the upper-stage graph represents permeate gas fluxes of the hydrogen gas obtained from above Equation (3), and $J(CO_2)$ in the lower-stage graph represents permeate gas fluxes of the carbon dioxide gas obtained from above Equation (3). The horizontal axis common to each graph represents the pressure gradient $\Delta P/L$.

The level of the hydrogen gas in the mixed gas supplied from the mixed gas source 300 was changed to three levels: 20% by mole (Example 1), 50% by mole (Example 2), and 80% by mole (Example 3). Additionally, permeate gas fluxes were also measured regarding each of Reference Examples: cases in which the gas supplied from the mixed gas source 300 was 100% by mole of carbon dioxide gas (Reference Example 1) and was 100% by mole of hydrogen gas (Reference Example 2).

Scales of the vertical axis are different between the upper-stage graph and the lower-stage graph. Regarding all of Examples 1 to 3, slopes on the upper-stage graph, that is, the permeability coefficients of the hydrogen gas (see Equation (3)) are larger than the slopes on the lower-stage graph, that is, the permeability coefficients of the carbon dioxide gas (see Equation (3)).

The graph of Reference Example 1 corresponds to the line b of FIG. 2, and the graph of Reference Example 2 corresponds to the line a-1 of FIG. 2. Strictly speaking, not only the graph of Reference Example 1 but also the graph of Reference Example 2 has an x-axis intercept that is not zero. However, a clear difference is observed between the x-axis intercept of the graph of Reference Example 1 and the x-axis intercept of the graph of Reference Example 2.

Even in each of Examples 1 to 3, there was observed a slight difference (hereinafter referred to as critical pressure gradient difference) between an x-axis intercept of the upper-stage graph representing the permeate gas flux $J(H_2)$ of the hydrogen gas and an x-axis intercept of the lower-stage graph representing the permeate gas flux $J(CO_2)$ of carbon dioxide gas.

The critical pressure gradient difference was 5.6 MPa/m in Example 1, 4.4 MPa/m in Example 2, and 2.8 MPa/m in Example 3.

In addition, regarding each of Examples 1 to 3, a separation coefficient $F(H_2)$ defined by the following equation was obtained. The separation coefficient $F(H_2)$ serves as an index for evaluating the hydrogen gas concentration ability of the porous body 100.

[Equation 4]

$$F(H_2) = \frac{J(H_2)}{J(H_2) + J(CO_2)} \quad (4)$$

Figure 6:
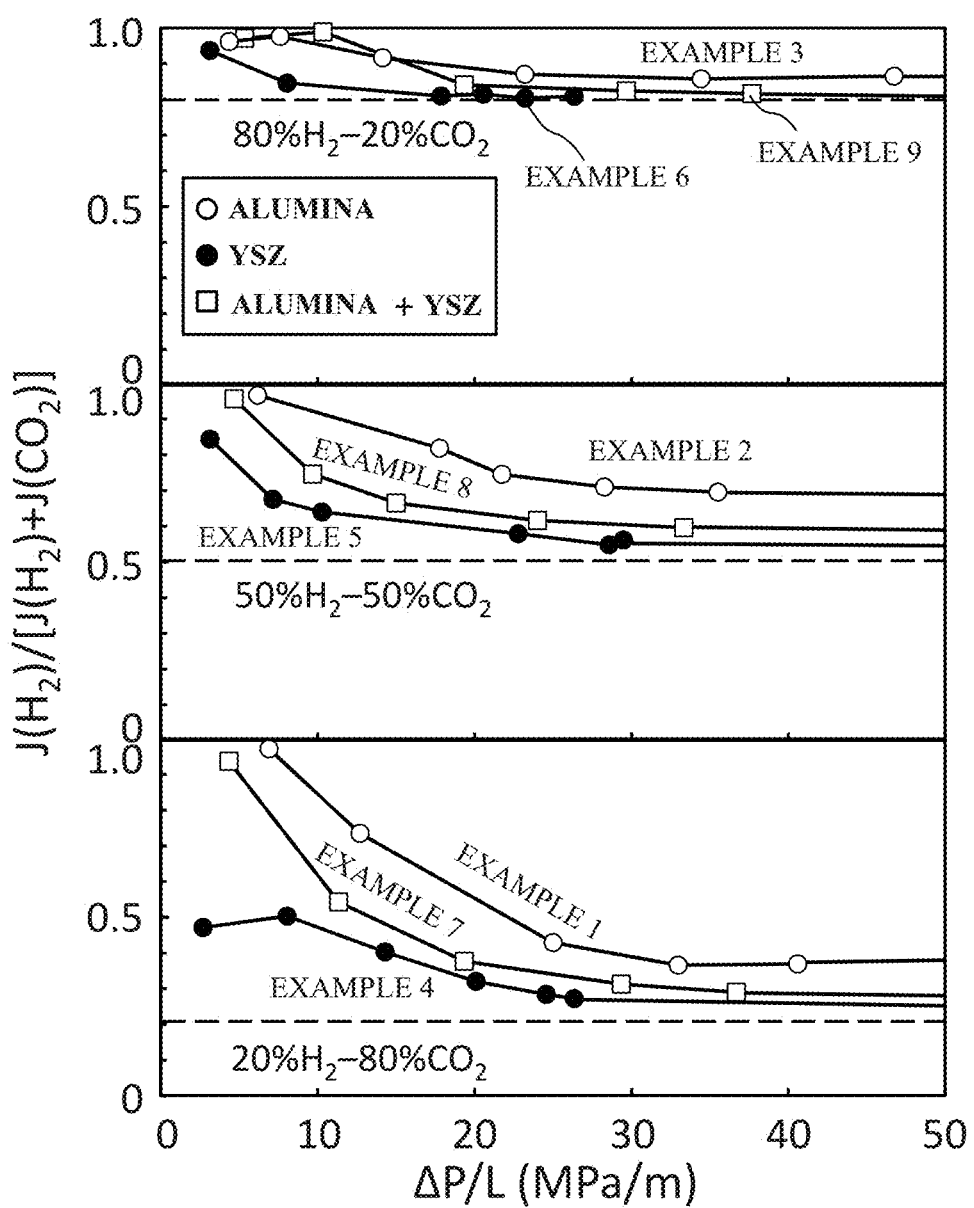
FIG. 6 is a graph depicting results of separation coefficient measurements concerning hydrogen gas under the temperature environment at room temperature.

FIG. 6 depicts a graph obtained by plotting measurement results of the separation coefficient $F(H_2)$. The upper-stage graph represents a result at a hydrogen gas level of 80% by mole in the mixed gas supplied from the mixed gas source 300 (Example 3); the middle-stage graph represents a result at a hydrogen gas level of 50% by mole (Example 2); and the lower-stage graph represents a result at a hydrogen gas level of 20% by mole (Example 1). The horizontal axis common to each graph represents the pressure gradient $\Delta P/L$.

Note that the broken lines indicate hydrogen gas levels in the mixed gas flown into the porous body 100. Additionally, FIG. 6 also depicts results of Examples 4 to 9 that will be described later, and will be referred to again in the later description of Examples 4 to 9.

As previously described, theoretically, the separation coefficient $F(H_2)$ is not supposed to depend on the pressure gradient $\Delta P/L$. However, as illustrated, in all of Examples 1 to 3, the results showed that the separation coefficient $F(H_2)$ became larger as the pressure gradient $\Delta P/L$ became smaller.

One of major factors that brought such results seems to be the presence of the above critical pressure gradient difference. In other words, under the presence of the critical pressure gradient difference, the pressure gradient ΔP/L is not cancelled when the ratio of permeate gas fluxes are taken, as indicated in Equation (4).

Additionally, besides the presence of the critical pressure gradient difference, other possible factors include that, in a region with low pressure gradients ΔP/L, permeate gas fluxes of the hydrogen gas and/or the carbon dioxide gas do not simply follow the proportional relationship indicated by Equation (1) or (2) but may follow a nonlinear relationship.

As depicted in FIG. 6, the effect that as the pressure gradient ΔP/L was smaller, the separation coefficient $F(H_2)$ became larger was recognized in a region with pressure gradients ΔP/L of below 50 MPa/m. The separation coefficient $F(H_2)$ converged to a certain value along with increase in the pressure gradient ΔP/L, and in a region with pressure gradients ΔP/L of 50 MPa/m or more, the separation coefficient $F(H_2)$ was confirmed to hardly depend on the pressure gradients ΔP/L, as shown in the theory.

The above description showed that setting the pressure gradient ΔP/L to below 50 MPa/m under the temperature environment at room temperature enables full exhibition of the hydrogen gas concentration ability of the porous body 100, so that the porous body 100 can exhibit a separation coefficient equal to or more than a theoretical value.

Particularly, as depicted in FIG. 6, when the pressure gradient ΔP/L is 30 MPa/m or less, dependence of the separation coefficient $F(H_2)$ on the pressure gradient ΔP/L becomes large, and the separation coefficient $F(H_2)$ becomes close to one. When the pressure gradient ΔP/L is 10 MPa/m or less, the separation coefficient $F(H_2)$ becomes almost one.

EXAMPLES 4 TO 5 AND REFERENCE EXAMPLES 3 AND 4

Next, Examples 4 to 6 and Reference Examples 3 and 4 will be described.

To an yttria-stabilized zirconia (YSZ) powder (product name: TZ-8Y, manufactured by Tosoh Co., Ltd.) having a specific surface area of 14.9 $m^2/g$, a median diameter of 40 nm, and an isoelectric point of pH 7.8 was added a dispersant liquid having a pH of 3, and the mixture was stirred for 24 hours to prepare a suspension. It is to be noted that the dispersant liquid forms an electric double layer on respective particles of the YSZ powder to cause occurrence of electrostatic repulsion between the particles. The suspension contains 30% by volume of the YSZ powder and the dispersant liquid as the remainder.

Next, the suspension was filtered through an upper dehydrating-type filtering apparatus and made into a molded body. Furthermore, the molded body was dried at 100° C. for 24 hours, and then sintered at 1100° C. for 1 hour in air to obtain an YSZ porous body. Note that the length (thickness) L of the YSZ porous body in a direction in which the mixed gas permeates is 3 mm.

Figure 7A:
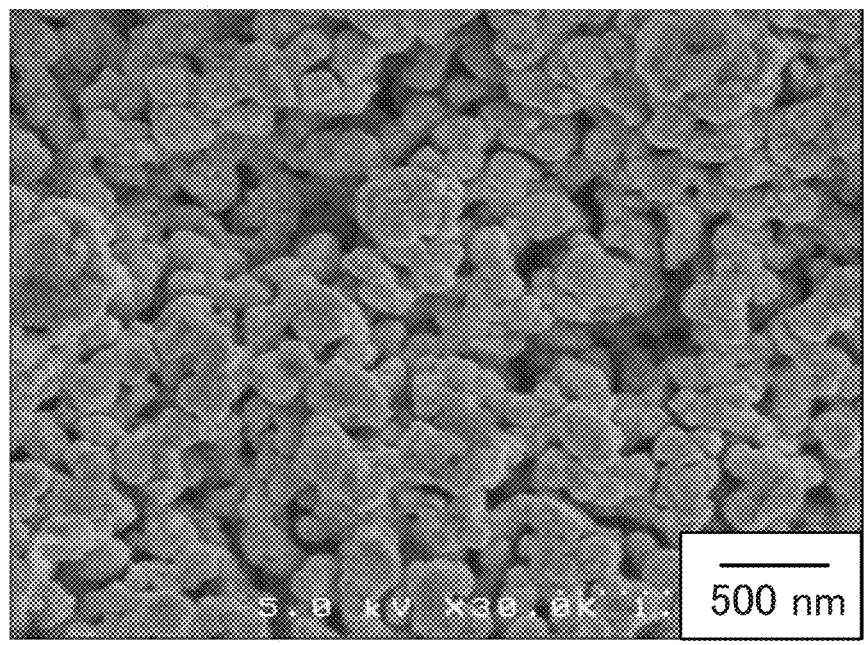
FIG. 7A is a SEM photograph of a YSZ porous body.

FIG. 7A depicts a SEM photograph of the obtained YSZ porous body. As depicted in the drawing, a porous tissue formed by adhesion between the particles of the YSZ powder was recognized.

Figure 7B:
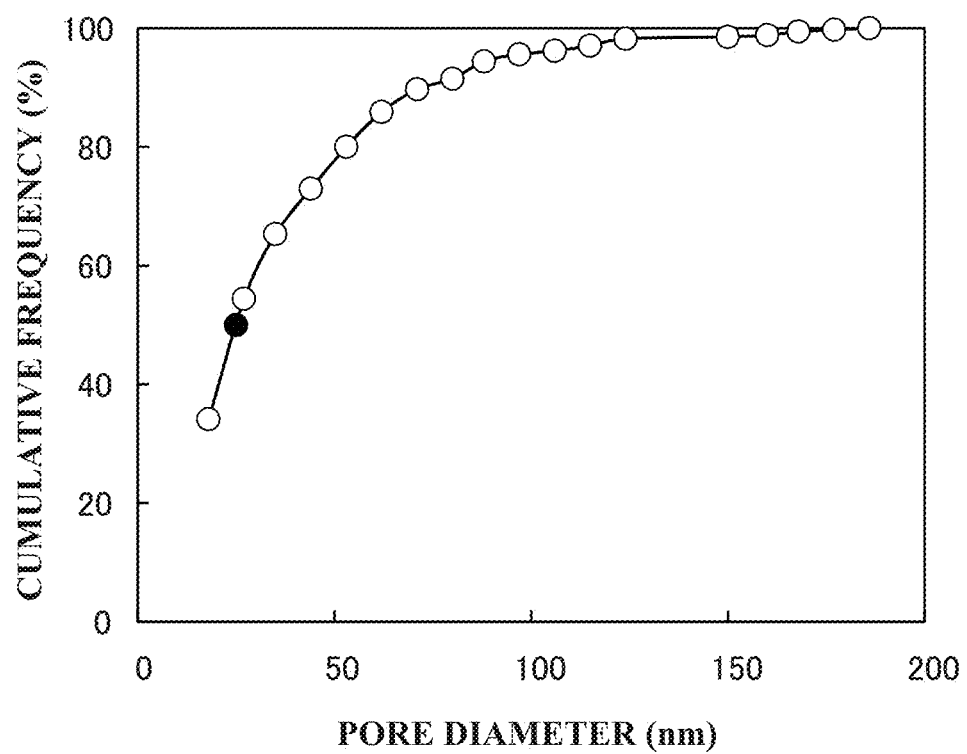
FIG. 7B is a graph depicting a cumulative pore diameter distribution of the YSZ porous body.

FIG. 7B depicts a cumulative pore diameter distribution of the obtained YSZ porous body. The pore diameter distribution of the porous body was measured by an intercept method using the SEM image. The maximum pore diameter thereof was 190 nm, and the median diameter (D50) thereof was 25 nm.

Additionally, the density and the like of the YSZ porous body were measured by the Archimedes' method, resulting in a relative density of 50.4%, an open porosity of 40.5%, and a closed porosity of 9.1%.

Next, hydrogen gas concentration was performed similarly to Examples 1 to 3 previously described by using the YSZ porous body as the porous body 100 of the hydrogen gas producing apparatus of FIG. 4 under a temperature environment at approximately 25° C. as room temperature. Then, permeate gas fluxes of the hydrogen gas and the carbon dioxide gas were measured.

Figure 8:
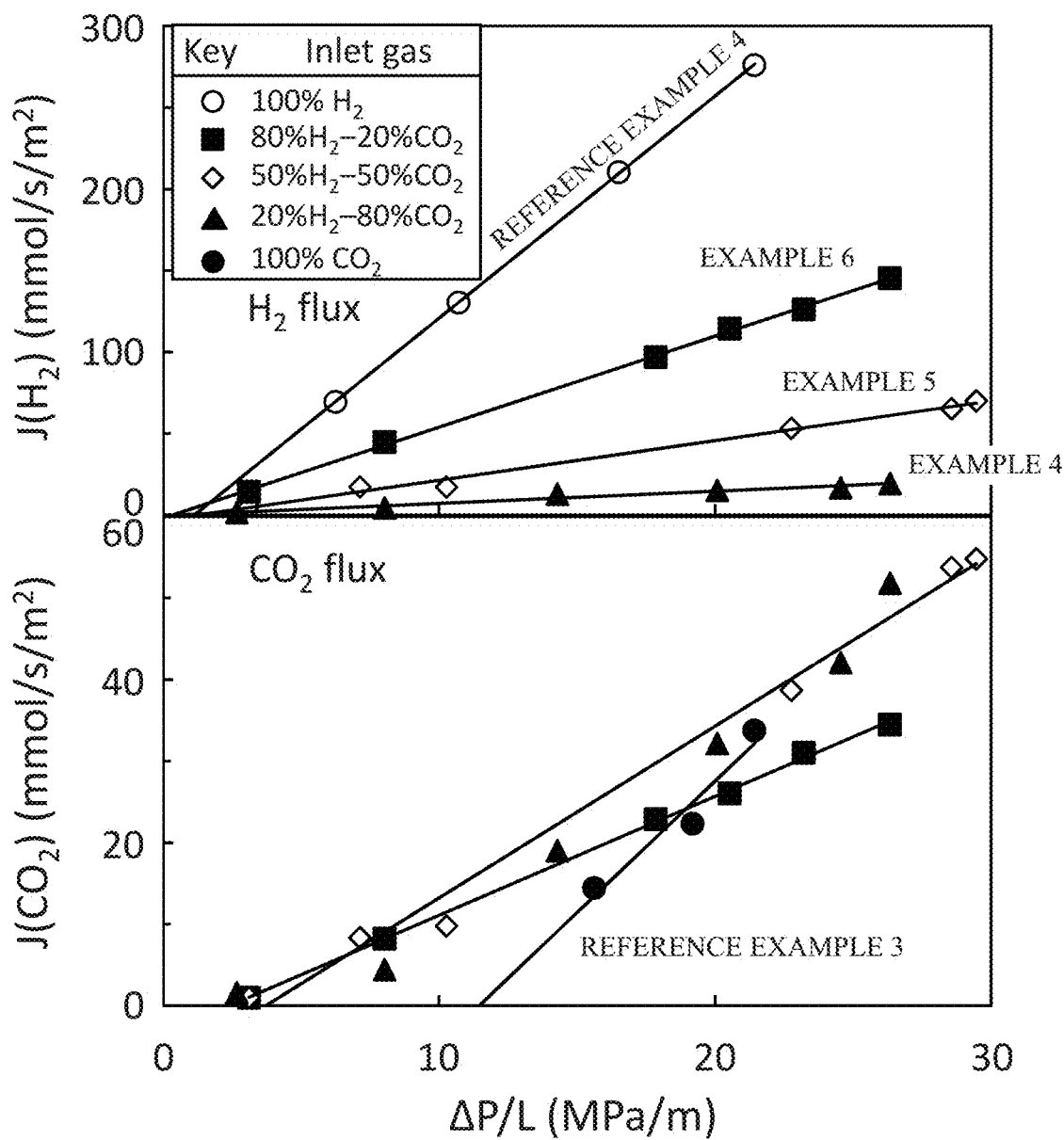
FIG. 8 is a graph depicting results of permeate gas flux measurements concerning hydrogen gas and carbon dioxide gas in a case in which hydrogen gas concentration was performed by using the YSZ porous body under a temperature environment at room temperature.

FIG. 8 depicts a graph obtained by linearly approximating plots of results of permeate gas flux measurements by a least-squares method. The level of the hydrogen gas in the mixed gas supplied from the mixed gas source 300 was changed to three levels: 20% by mole (Example 4), 50% by mole (Example 5), and 80% by mole (Example 6). Permeate gas fluxes were also measured regarding Reference Examples: cases in which the gas supplied from the mixed gas source 300 was 100% by mole of carbon dioxide gas (Reference Example 3) and was 100% by mole of hydrogen gas (Reference Example 4).

Scales of the vertical axis are different between the upper-stage graph and the lower-stage graph of FIG. 8. Regarding Examples 5 and 6, slopes on the upper-stage graph, that is, the permeability coefficients of the hydrogen gas (see Equation (3)) are larger than slopes on the lower-stage graph, that is, the permeability coefficients of the carbon dioxide gas (see Equation (3)).

The critical pressure gradient difference was 3.8 MPa/m in Example 4, 2.5 MPa/m in Example 5, and 2.1 MPa/m in Example 6.

FIG. 6 also depicts a graph obtained by plotting measurement results of the separation coefficient $F(H_2)$ regarding Examples 4 to 6. Similarly to Examples 1 to 3, results show that when the pressure gradient ΔP/L is below 50 MPa/m, the separation coefficient $F(H_2)$ becomes larger as the pressure gradient ΔP/L becomes smaller.

Additionally, in a region with pressure gradients ΔP/L of 50 MPa/m or more, the separation coefficient $F(H_2)$ was confirmed to hardly depend on the pressure gradients ΔP/L, as shown in the theory.

Accordingly, setting the pressure gradient ΔP/L to below 50 MPa/m under the temperature environment at room temperature enables fully exhibition of the hydrogen gas concentration ability of the porous body 100, so that the porous body 100 can exhibit a separation coefficient equal to or more than a theoretical value. Particularly, when the pressure gradient ΔP/L is 30 MPa/m or less, dependence of the separation coefficient $F(H_2)$ on the pressure gradient ΔP/L becomes large, and the separation coefficient $F(H_2)$ becomes a large value.

EXAMPLES 7 TO 9 AND REFERENCE EXAMPLES 5 AND 6

Next, Examples 7 to 9 and Reference Examples 5 and 6 will be described.

There was formed a joined body (hereinafter referred to as alumina-YSZ double layer porous body) of the alumina porous body according to Examples 1 to 3 and the YSZ porous body according to Examples 4 to 6. Thicknesses of the alumina porous body and the YSZ porous body were both set to 1.5 mm to obtain an alumina-YSZ double layer porous body having a thickness of 3 mm.

Similarly to Examples 1 to 6 previously described, hydrogen gas concentration was performed under a temperature environment at approximately 25° C. as room temperature by using the alumina-YSZ double layer porous body as the porous body 100 of the hydrogen gas producing apparatus of FIG. 4. Note that the alumina-YSZ double layer porous body was placed in such a direction that the mixed gas flew in from an alumina porous body side. Then, permeate gas fluxes of the hydrogen gas and the carbon dioxide gas were measured.

Figure 9:
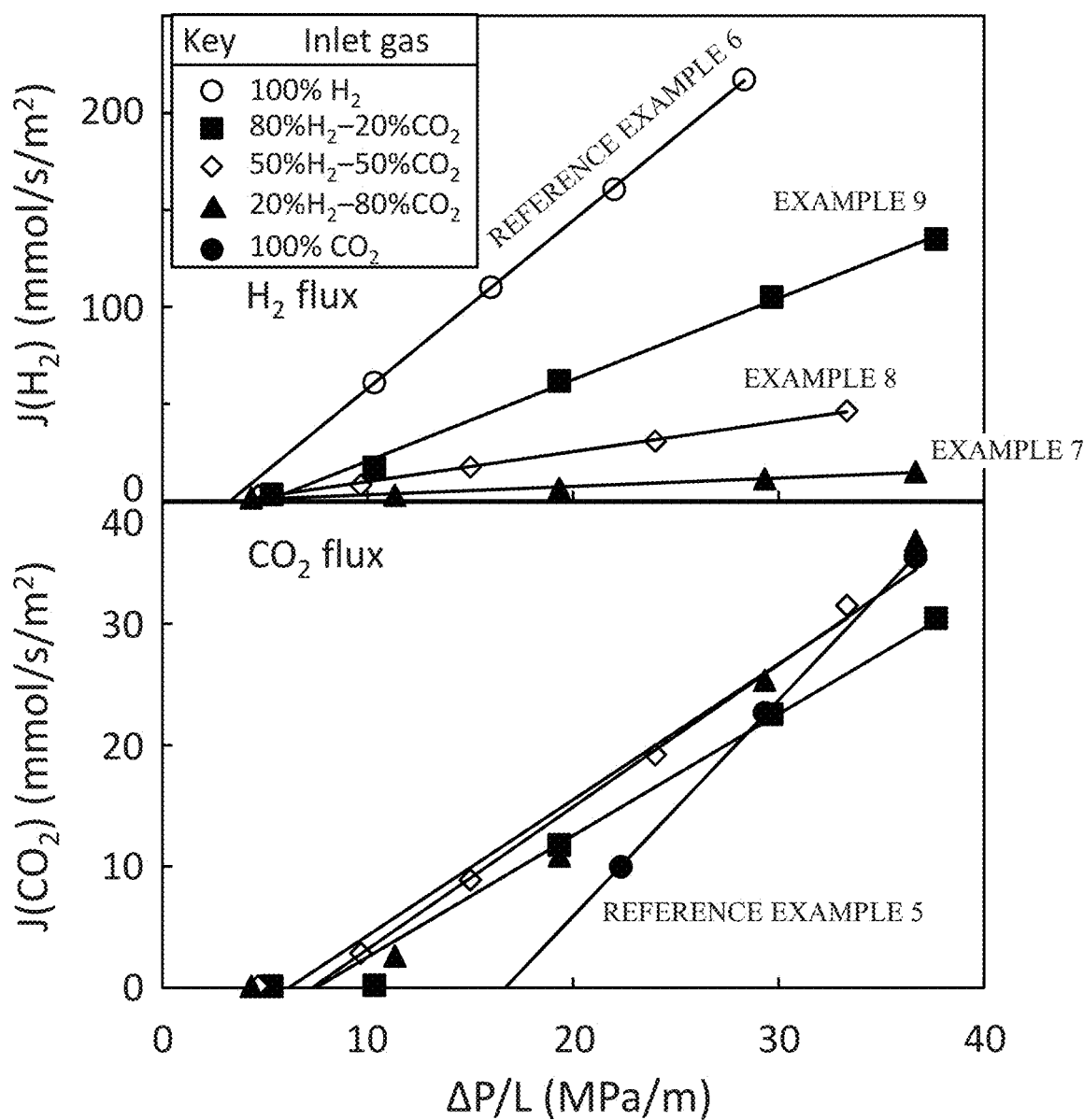
FIG. 9 is a graph depicting results of permeate gas flux measurements concerning hydrogen gas and carbon dioxide gas in a case in which hydrogen gas concentration was performed by using a joined body of the alumina porous body and the YSZ porous body under a temperature environment at room temperature.

FIG. 9 depicts a graph obtained by linearly approximating plots of results of the permeate gas flux measurements by a least-squares method. The level of the hydrogen gas in the mixed gas supplied from the mixed gas source 300 was changed to three levels: 20% by mole (Example 7), 50% by mole (Example 8), and 80% by mole (Example 9). Permeate gas fluxes were also measured regarding Reference Examples: cases in which the gas supplied from the mixed gas source 300 was 100% by mole of carbon dioxide gas (Reference Example 5) and was 100% by mole of hydrogen gas (Reference Example 6).

Scales of the vertical axis are different between the upper-stage graph and the lower-stage graph of FIG. 9. Regarding Examples 8 and 9, slopes on the upper-stage graph, that is, the permeability coefficients of the hydrogen gas (see Equation (3)) are larger than slopes on the lower-stage graph, that is, the permeability coefficients of the carbon dioxide gas (see Equation (3)).

The critical pressure gradient difference was 4.7 MPa/m in Example 7, 2.6 MPa/m in Example 8, and 2.4 MPa/m in Example 9.

FIG. 6 also depicts a graph obtained by plotting measurement results of separation coefficient $F(H_2)$ regarding Examples 7 to 9. Similarly to Examples 1 to 6, results show that when the pressure gradient $\Delta P/L$ is below 50 MPa/m, the separation coefficient $F(H_2)$ becomes larger as the pressure gradient $\Delta P/L$ becomes smaller.

Additionally, in a region with pressure gradients $\Delta P/L$ of 50 MPa/m or more, the separation coefficient $F(H_2)$ was confirmed to hardly depend on the pressure gradients $\Delta P/L$, as shown in the theory.

Accordingly, setting the pressure gradient $\Delta P/L$ to below 50 MPa/m under the temperature environment at room temperature enables full exhibition of the hydrogen gas concentration ability of the porous body 100, so that the porous body 100 can exhibit a separation coefficient equal to or more than a theoretical value. Particularly, when the pressure gradient $\Delta P/L$ is 30 MPa/m or less, dependence of the separation coefficient $F(H_2)$ on the pressure gradient $\Delta P/L$ becomes large, and the separation coefficient $F(H_2)$ becomes close to one.

Additionally, in almost all of Examples 1 to 9, the separation coefficient $F(H_2)$ became almost 1 when the pressure gradient $\Delta P/L$ was 10 MPa/m or less. When the separation coefficient $F(H_2)$ is one, only the hydrogen gas flows out from the porous body.

EXAMPLES 10 TO 18

Next, Examples 10 to 18 will be described.

There was prepared a silicon carbide (SiC) powder (manufactured by Yakushima Denko Co., Ltd.) having a specific surface area of 13.4 m$^2$/g, a median diameter of 800 nm, and an isoelectric point of pH 2.5. The silicon carbide powder consists of SiO$_2$: 0.66% by mass, C: 0.37% by mass, Al: 0.004% by mass, Fe: 0.013% by mass, and SiC: the rest.

To 100% by mass of the silicon carbide powder were added the α-alumina powder used in Examples 1 to 3 in an amount of 2% by mass in terms of outer percentage and a Y$_2$O$_3$ powder (manufactured by Shin-Etsu Chemical Co., Ltd.) having a Y$_2$O$_3$ purity of more than 99.9% by mass, a specific surface area of 15.0 m$^2$/g, a median diameter of 290 nm, and an isoelectric point of pH 7.5 in an amount of 2% by mass in terms of outer percentage, as sintering aids, and the mixture was mixed together to obtain a mixed powder.

A dispersant liquid was added and mixed into the obtained mixed powder to obtain a suspension having a solid amount of 30% by volume and a pH of 5. The obtained suspension was stirred for 24 hours, and solidified on a gypsum board to obtain a solidified product. Furthermore, the obtained solidified product was pressurized and sintered for 2 hours at 39 MPa in an Ar atmosphere to obtain a silicon carbide porous body.

The temperature for sintering the solidified product was changed to 1400° C., 1500° C., and 1700° C. to obtain three kinds of silicon carbide porous bodies.

Figure 10A:
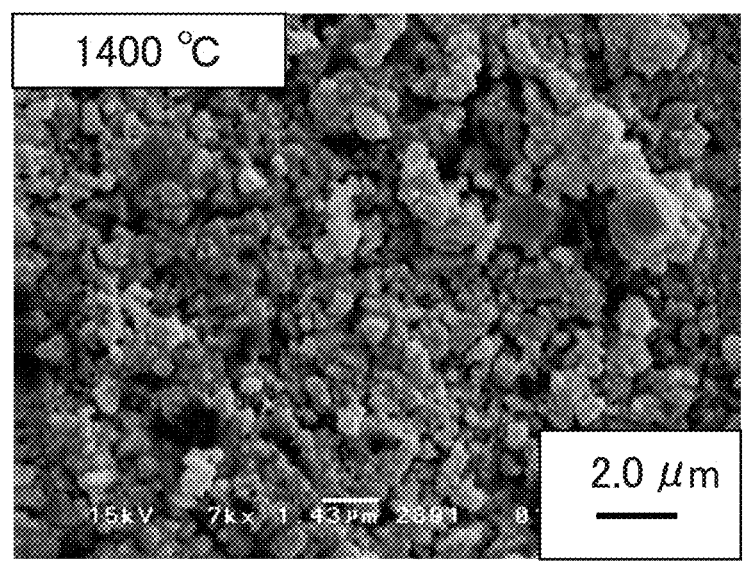
FIG. 10A is a SEM photograph of a silicon carbide porous body obtained by sintering at 1400° C.
Figure 10B:
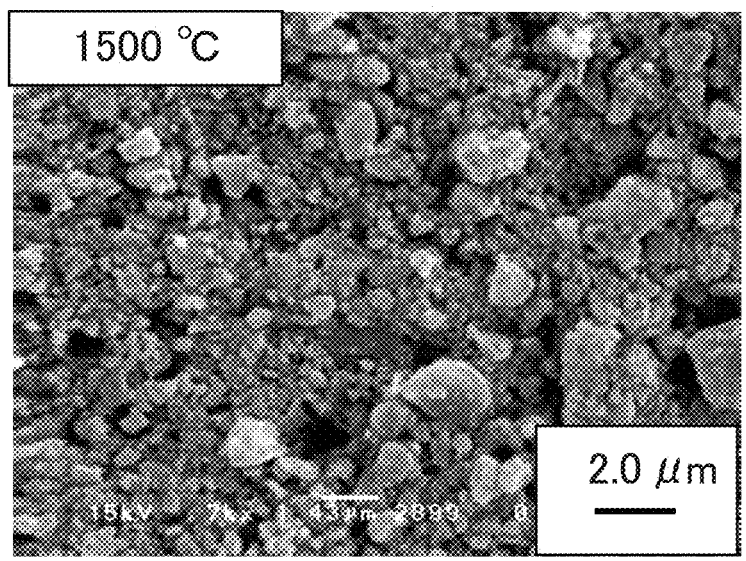
FIG. 10B is a SEM photograph of a silicon carbide porous body obtained by sintering at 1500° C.
Figure 10C:
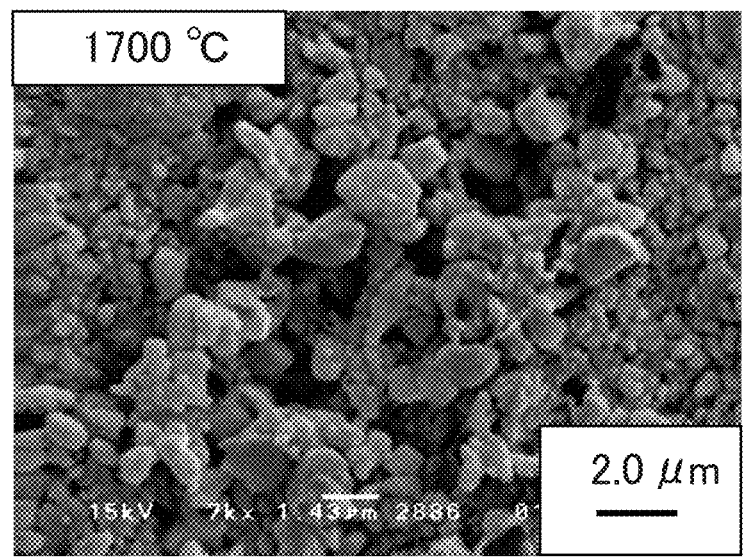
FIG. 10C is a SEM photograph of a silicon carbide porous body obtained by sintering at 1700° C.

FIGS. 10A to 10C depict SEM photographs of the obtained silicon carbide porous bodies. FIG. 10A depicts the silicon carbide porous body obtained by sintering at 1400° C.; FIG. 10B depicts the silicon carbide porous body obtained by sintering at 1500° C.; and FIG. 10C depicts the silicon carbide porous body obtained by sintering at 1700° C. As depicted, porous tissues formed by adhesion between particles of the silicon carbide powder were recognized.

Figure 11:
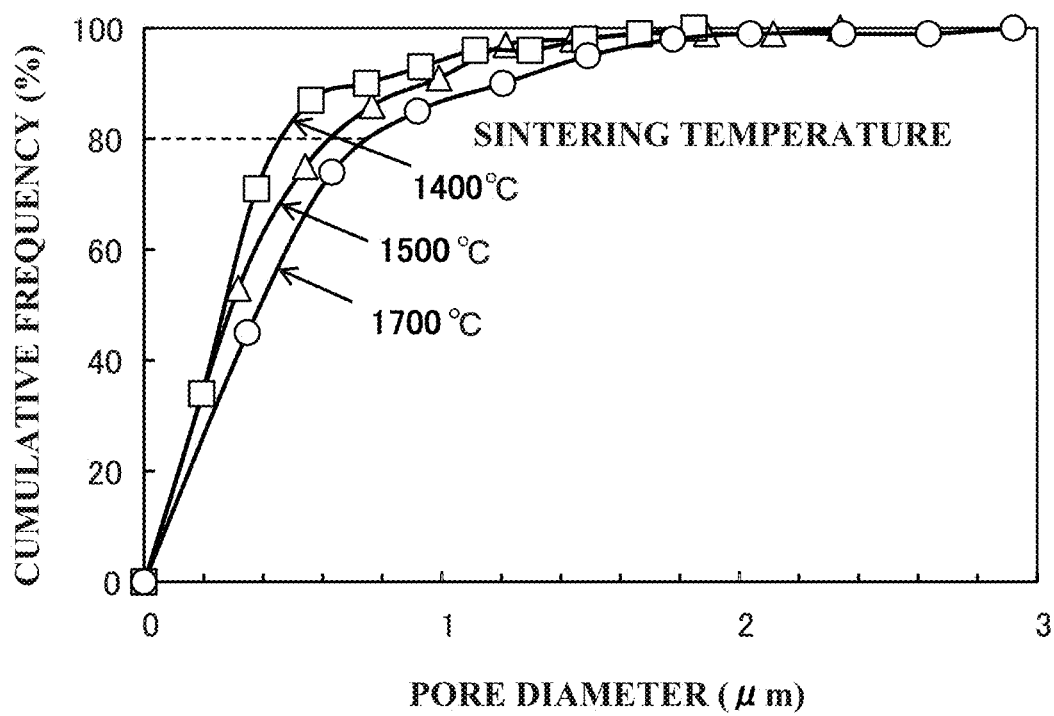
FIG. 11 is a graph depicting cumulative pore diameter distributions of the silicon carbide porous bodies.

FIG. 11 depicts cumulative pore diameter distributions of the obtained silicon carbide porous bodies. The pore diameter distributions of the porous bodies were measured by an intercept method using the SEM images. Median diameters (D50) of the silicon carbide porous bodies obtained by sintering at 1400° C., 1500° C., and 1700° C. were 48 nm, 112 nm, and 152 nm, respectively. Additionally, the silicon carbide porous body obtained by sintering at 1700° C. had a maximum pore diameter of approximately 3000 nm.

Additionally, all of the silicon carbide porous bodies obtained by sintering at 1400° C., 1500° C., and 1700° C. had a pore diameter (D80) of 800 nm or less at a number cumulative frequency of 80% in a cumulative pore diameter distribution.

Additionally, the densities and the like of the silicon carbonate porous bodies were measured by the Archimedes' method. The silicon carbide porous body whose sintering temperature was 1400° C. had a relative density of 61.1%, an open porosity of 36.1%, and a closed porosity of 2.8%. The silicon carbide porous body whose sintering temperature was 1500° C. had a relative density of 69.3%, an open porosity of 28.1%, and a closed porosity of 2.6%. The silicon carbide porous body whose sintering temperature was 1700° C. had a relative density of 75.4%, an open porosity of 17.9%, and a closed porosity of 6.7%.

Next, similarly to Examples 1 to 9 previously described, hydrogen gas concentration was performed by using the above three kinds of silicon carbide porous bodies as the porous body 100 of the hydrogen gas producing apparatus of FIG. 4 under a temperature environment at 25° C. as room temperature. The hydrogen gas level in the mixed gas supplied from the mixed gas source 300 was changed to three levels: 20% by mole, 50% by mole, and 80% by mole.

Table 1 depicts a relationship between Example numbers and experimental conditions.

TABLE 1

| Composition of inflow gas | Sintering temperatures | | |
|---|---|---|---|
| ($H_2$:$CO_2$) | 1400° C. | 1500° C. | 1700° C. |
| 80:20 | Example 10 | Example 11 | Example 12 |
| 50:50 | Example 13 | Example 14 | Example 15 |
| 20:80 | Example 16 | Example 17 | Example 18 |

The critical pressure gradient difference was 0.3 MPa/m in Example 10, 1.1 MPa/m in Example 11, 1.0 MPa/m in Example 12, 0.3 MPa/m in Example 13, 2.1 MPa/m in Example 14, 2.3 MPa/m in Example 15, 0.7 MPa/m in Example 16, 0.6 MPa/m in Example 17, and 1.6 MPa/m in Example 18.

Figure 12:
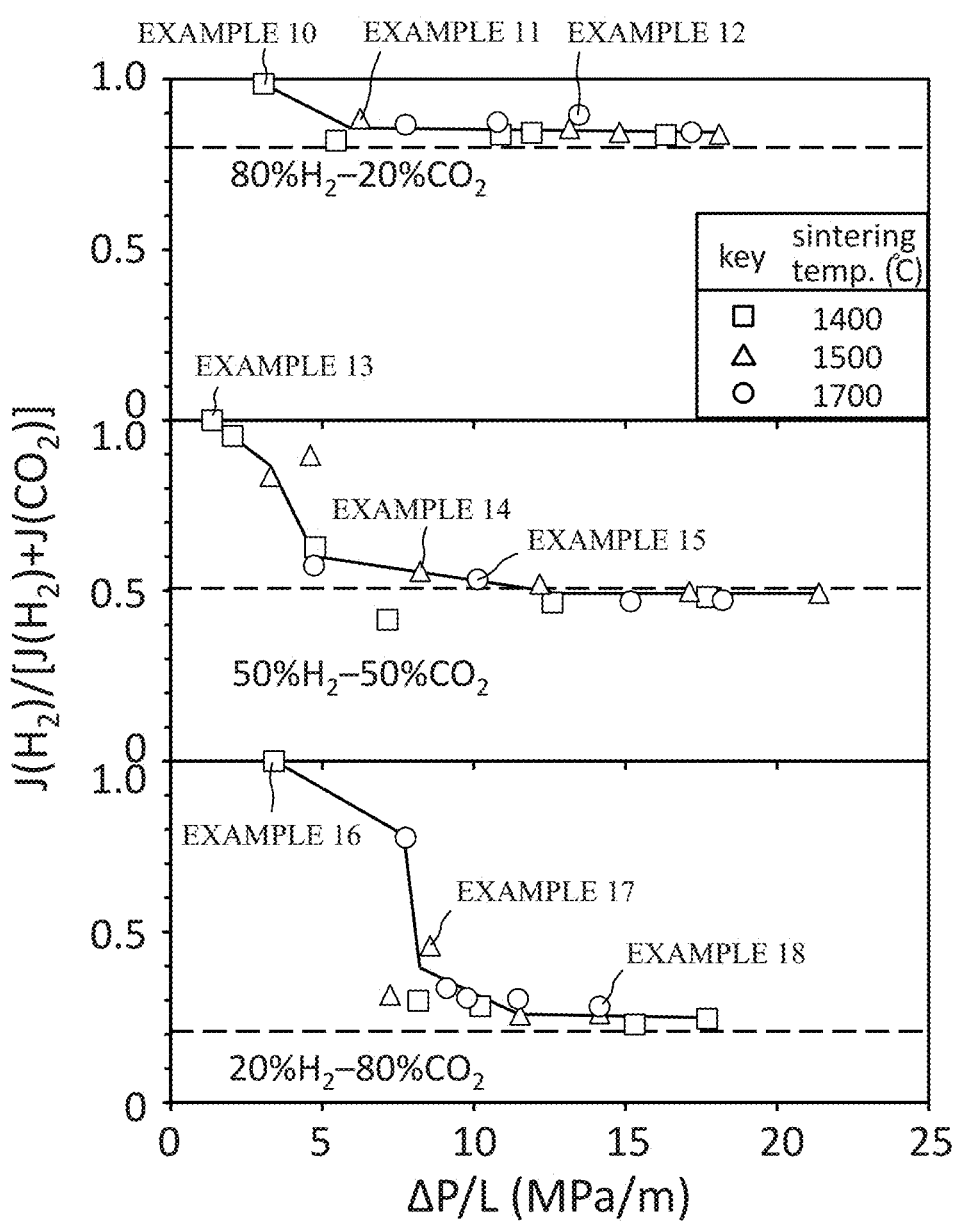
FIG. 12 is a graph depicting results of separation coefficient measurements concerning hydrogen gas under the temperature environment at room temperature.

FIG. 12 depicts a graph obtained by plotting measurement results of the separation coefficient $F(H_2)$. In all of Examples 10 to 18, results showed that in a region with pressure gradients $\Delta P/L$ of below 25 MPa/m under the temperature environment at room temperature, the separation coefficient $F(H_2)$ became larger as the pressure gradient $\Delta P/L$ was smaller. Particularly, when the pressure gradient $\Delta P/L$ is 10 MPa/m or less, the dependence of the separation coefficient $F(H_2)$ on the pressure gradient $\Delta P/L$ becomes large, and the separation coefficient $F(H_2)$ becomes close to one.

The description hereinabove was given of the Examples concentrating hydrogen gas under the temperature environment at room temperature. Next, Examples 19 to 32 concentrating hydrogen gas under a temperature environment at 200° C. or higher will be described.

Figure 13:
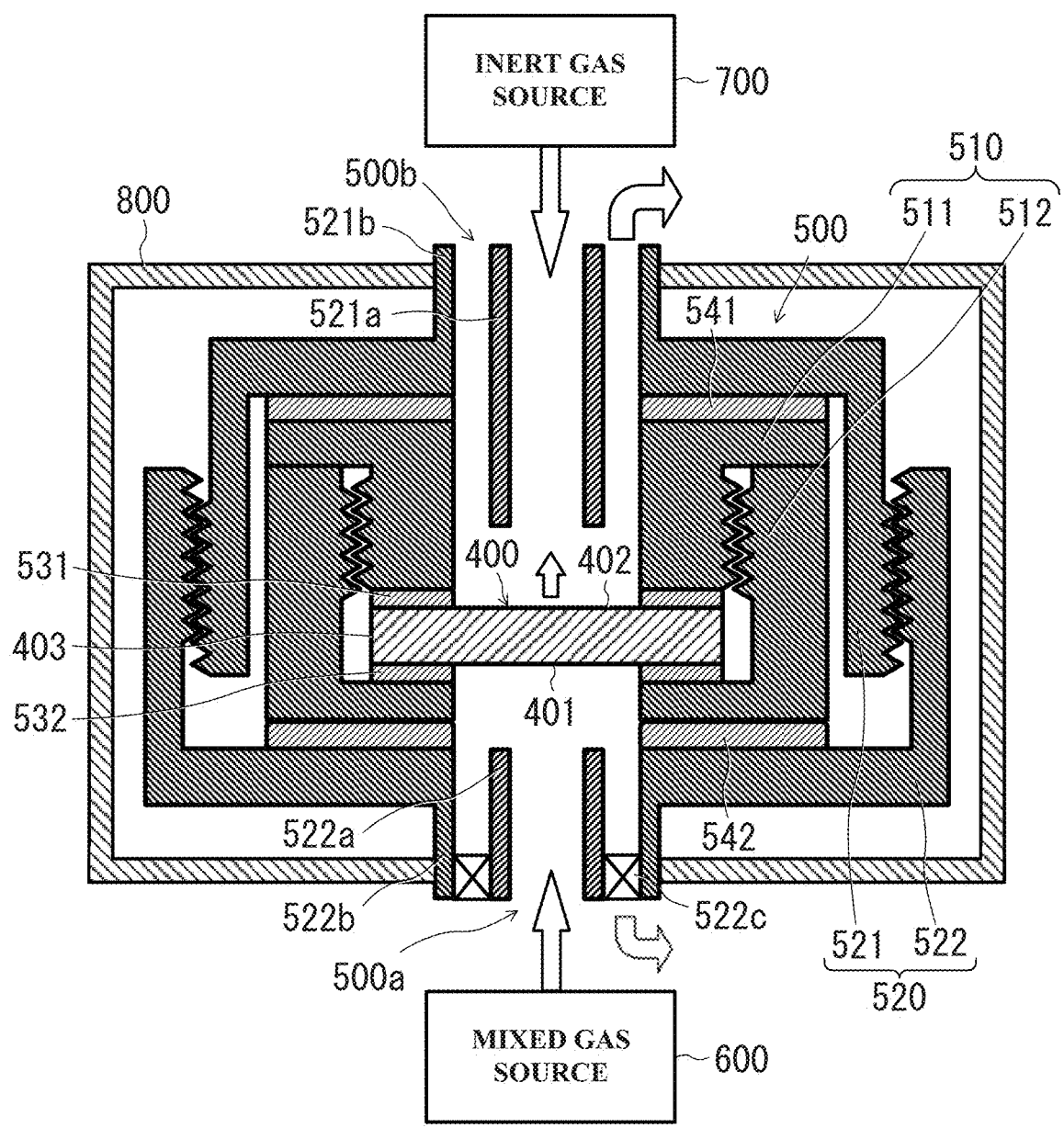
FIG. 13 is a partial cross-sectional schematic diagram of a hydrogen gas producing apparatus according to another Example.

FIG. 13 depicts a partial cross-sectional schematic diagram of a hydrogen gas producing apparatus used in hydrogen gas concentration. The hydrogen gas producing apparatus includes a porous body 400, a gas flow channel 500 inside which the porous body 400 is arranged, a mixed gas source 600 that supplies a mixed gas from a flow inlet 500a of the gas flow channel 500, and an inert gas source 700 that supplies argon gas as an inert gas from a flow outlet 500b of the gas flow channel 500.

The porous body 400 has a front surface with an inflow region 401 into which the mixed gas flows, a rear surface with an outflow region 402 from which the gas flows out, and a side surface 403 connecting the front surface and the rear surface together. The front surface and the rear surface face each other in a thickness direction of the porous body 400.

The gas flow channel 500 includes a first holding member 510 that holds the porous body 400 while sandwiching a circumferential edge portion of the porous body 400 circular in plan view in a thickness direction thereof and airtightly enclosing the side surface 403 of the porous bod 400 and a second holding member 520 that airtightly sandwiches the first holding member 510 in a direction parallel to the thickness direction of the porous body 400.

The first holding member 510 sandwiches the porous body 400 via metallic annular sealing members 531 and 532. The first holding member 510 includes a male member 511 and a female member 512 screwed to each other. One of the male member 511 or the female member 512 is allowed to move forward and backward in the thickness direction of the porous body 400 by being screwed with respect to the other one thereof. Thereby, pressure for sandwiching the porous body 400 can be adjusted.

The second holding member 520 sandwiches the first holding member 510 via metallic annular sealing members 541 and 542. The second holding member 520 also includes a male member 521 and a female member 522 screwed to each other, and one of the male member 521 or the female member 522 is allowed to move forward and backward in the thickness direction of the porous body 400 by being screwed to the other one thereof. Thereby, pressure for sandwiching the first holding member 510 can be adjusted.

The female member 522 forms the flow inlet 500a of the gas flow channel 500, and has a double tube structure including an inner tube 522a and an outer tube 522b. The mixed gas source 600 causes a mixed gas to flow in from the inner tube 522a. Additionally, a valve 522c is interposed between the inner tube 522a and the outer tube 522b.

The male member 521 forms the flow outlet 500b of the gas flow channel 500, and has a double tube structure including an inner tube 521a and an outer tube 521b, as in the female member 522. The inert gas source 700 causes argon gas to flow in from the inner tube 521a. After passing through the porous body 400, the gas flows out, together with the argon gas, from between the inner tube 521a and the outer tube 521b.

The hydrogen gas producing apparatus described hereinabove is placed inside an electric furnace 800 as heater. Hydrogen gas concentration was performed under a temperature environment in which an environmental temperature in the electric furnace 800 was stabilized to 200° C., 400° C., or 500° C. Herein, "to stabilize the environmental temperature in the electric furnace 800 to T° C." specifically means a condition that the porous body 400 and the gas flow channel 500 are stabilized to T° C. The mixed gas is also heated by the gas flow channel 500 during a process in which the gas flows through the gas flow channel 500, thereby becoming close to T° C.

The pressure gradient $\Delta P/L$ was variously changed by variously changing the inflow pressure $P_1$ into the inflow region 401 of the porous body 400 while maintaining the outflow pressure $P_2$ of the gas in the outflow region 402 of the porous body 400 at a substantially atmospheric pressure (0.1 MPa). Note that the length (thickness) L of the porous body 400 in a direction in which the mixed gas permeates is 3 mm.

Then, similarly to Examples 1 to 3, the permeate gas flux defined by Equation (3) above was measured regarding each of the hydrogen gas and the carbon dioxide gas by a soap-film flow meter. During the measurement, the inert gas source 700 supplied argon gas at a pressure of 0.1 MPa (atmospheric pressure) and a flow rate of approximately 5 ml/min. Thereby, collection of a permeate gas whose flux was small was also made possible. In other words, even the permeate gas whose flux is small can be caused to flow out together with the argon gas from between the inner tube 521a and the outer tube 521b, without allowing the gas to stay in the gas flow channel 500, and can be subjected to permeate gas flux measurement.

The hydrogen gas level in the mixed gas supplied from the mixed gas source 600 was changed to three levels: 20% by mole, 50% by mole, and 80% by mole. It is to be noted that, during a transition period for changing the hydrogen gas level, the valve 522c was open to allow for outflow of the mixed gas from the flow inlet 500a. Thereby, influence of the transition period on results of permeate gas flux measurement was prevented. At a phase when the hydrogen gas level in the mixed gas became stable, the valve 522c was closed to increase the inflow pressure $P_1$ of the mixed gas into the porous body 400.

Note that the porous body 400 used was one obtained by sintering a molded body formed by filtering a suspension containing 30% by volume of the α-alumina powder and the dispersant liquid as the remainder, similarly to the one used in Examples 1 to 3 previously described. However, hydrogen gas concentration was performed by using two kinds of porous bodies 400 formed at sintering temperatures of 900° C. and 1100° C.

Densities of the porous bodies 400 are different depending on the sintering temperatures. The relative density, open porosity, and closed porosity of the alumina porous body obtained by sintering at 900° C. were 59.3%, 40.4%, and 0.3%, respectively. The relative density, open porosity, and closed porosity of the alumina porous body obtained by sintering at 1100° C. were 70.2%, 29.3%, and 0.5%, respectively.

Table 2 depicts a relationship between Example numbers and experimental conditions.

TABLE 2

| Composition of inflow gas | Sintering temperature of porous body: 900° C. | | | Sintering temperature of porous body: 1100° C. | |
|---|---|---|---|---|---|
| | Temperatures in electric furnace | | | | |
| ($H_2$:$CO_2$) | 200° C. | 400° C. | 500° C. | 200° C. | 400° C. |
| 80:20 | Example 19 | Example 20 | Example 21 | Example 27 | Example 28 |
| 50:50 | Example 22 | Example 23 | Example 24 | Example 29 | Example 30 |
| 20:80 | Example 25 | Example 26 | | Example 31 | Example 32 |

Figure 14:
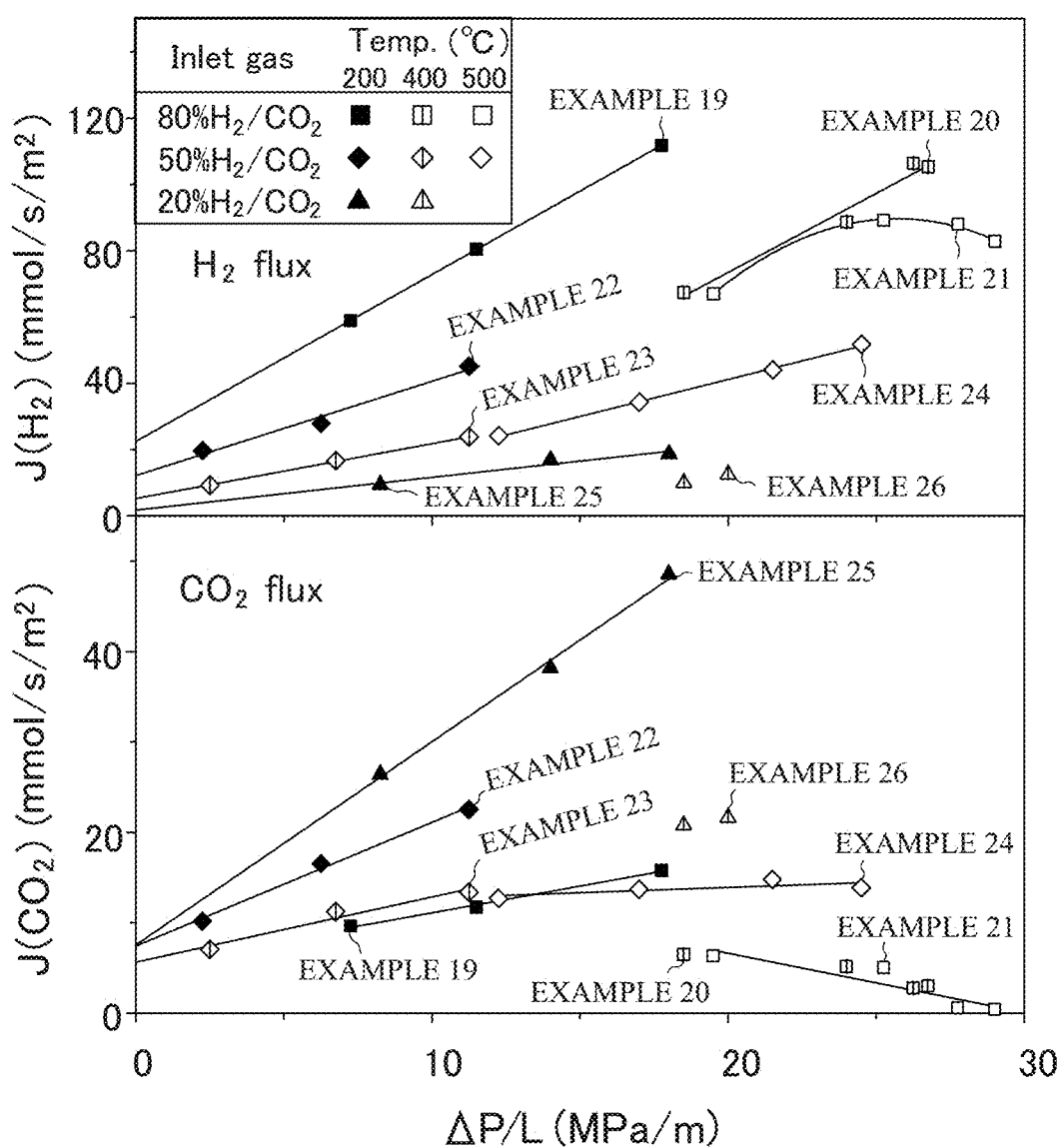
FIG. 14 is a graph depicting results of permeate gas flux measurements concerning hydrogen gas and carbon dioxide gas in a case in which hydrogen gas concentration was performed by using an alumina porous body under temperature environments at 200° C. or higher.

FIG. 14 depicts a graph obtained by plotting measurement results of permeate gas fluxes regarding Examples 19 to 26. $J(H_2)$ in the upper-stage graph represents a permeate gas flux of hydrogen gas obtained from Equation (3) above, and $J(CO_2)$ in the lower-stage graph represents a permeate gas flux of carbon dioxide gas obtained from Equation (3) above. The horizontal axis common to each graph represents the pressure gradient $\Delta P/L$.

Under temperature environments from 200 to 500° C., permeate gas fluxes of both of the hydrogen gas and the carbon dioxide gas did not exhibit a critical pressure gradient that was an intercept with respect to the horizontal axis. Additionally, in both of the hydrogen gas and the carbon dioxide gas, the permeate gas flux was reduced as the environmental temperature, that is, the temperature in the electric furnace was increased.

As depicted in the upper-stage $J(H_2)$ graph, in Example 21, the permeation flux of the hydrogen gas increased along with increase in the pressure gradient, and then slightly decreased. Additionally, as depicted in the lower-stage $J(CO_2)$ graph, in Examples 20 and 21, the permeation flux of the carbon dioxide gas decreased along with increase in the pressure gradient, and then became 1 mmol/s/m$^2$ or less at a pressure gradient of 28 MPa/m or more.

Figure 15:
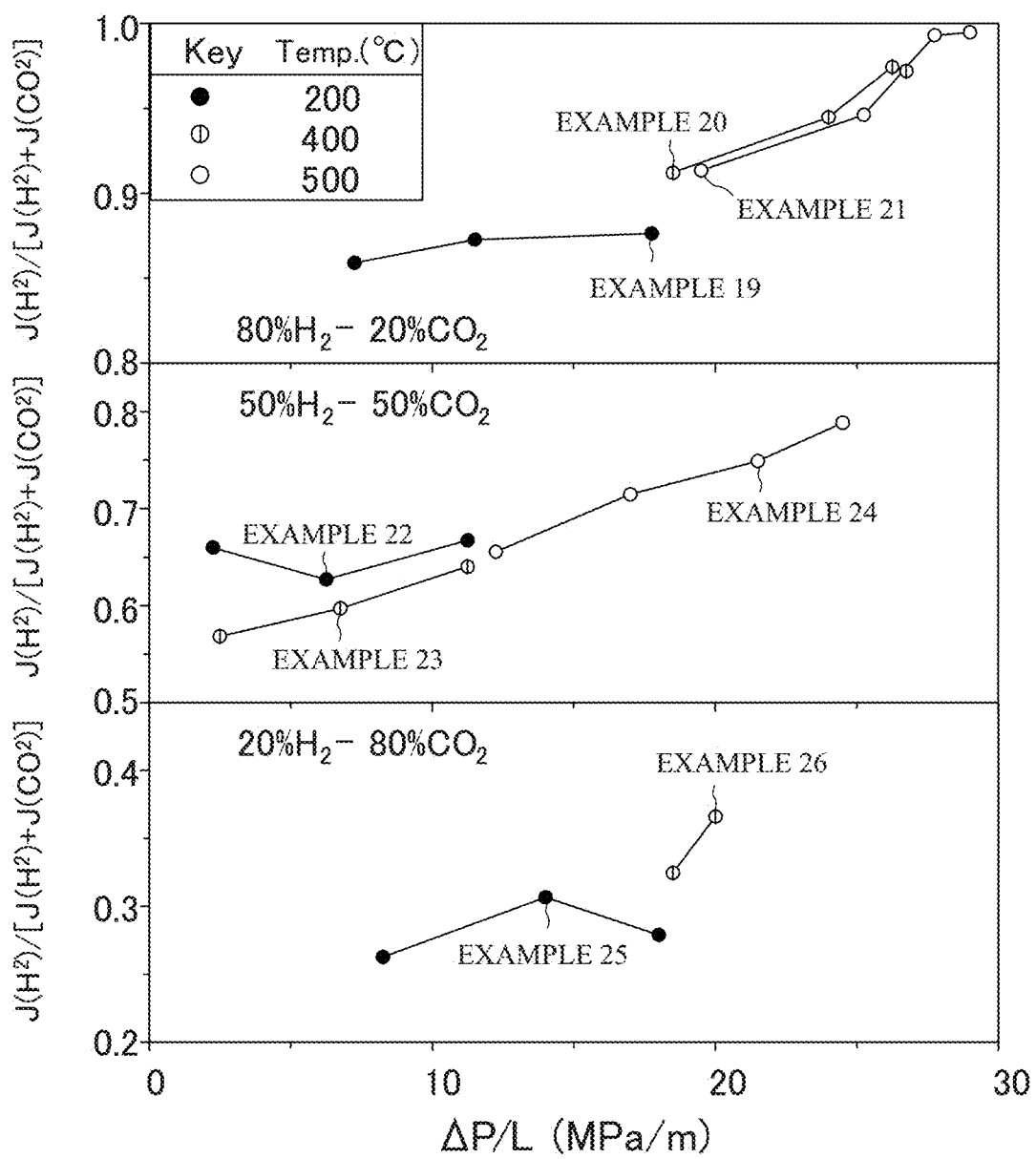
FIG. 15 is a graph depicting separation coefficients of hydrogen gas obtained from the measurement results of FIG. 14.

FIG. 15 depicts a graph obtained by plotting measurement results of the separation coefficient $F(H_2)$ defined by Equation (4) above regarding Examples 19 to 26. The upper-stage graph represents results at a hydrogen gas level of 80% by mole in the mixed gas supplied from the mixed gas source 600 (Examples 19 to 21); the middle-stage graph represents results at a hydrogen gas level of 50% by mole (Examples 22 to 24); and the lower-stage graph represents results at a hydrogen gas level of 20% by mole (Examples 25 and 26). The horizontal axis common to each graph represents pressure gradient $\Delta P/L$.

As depicted in each graph, at an environmental temperature of 200° C., the dependence of the separation coefficient $F(H_2)$ on the pressure gradient is small. At an environmental temperature of 400° C. or 500° C., the separation coefficient $F(H_2)$ increased as the pressure gradient increased, which indicated a tendency opposite to the cases (see FIG. 6 and FIG. 12) whose environmental temperature was room temperature. In the upper-stage graph, the separation coefficient $F(H_2)$ in Example 21 with the hydrogen gas level of 80% by mole in the mixed gas reached 0.995 at a pressure gradient of 29 MPa/m.

Figure 16:
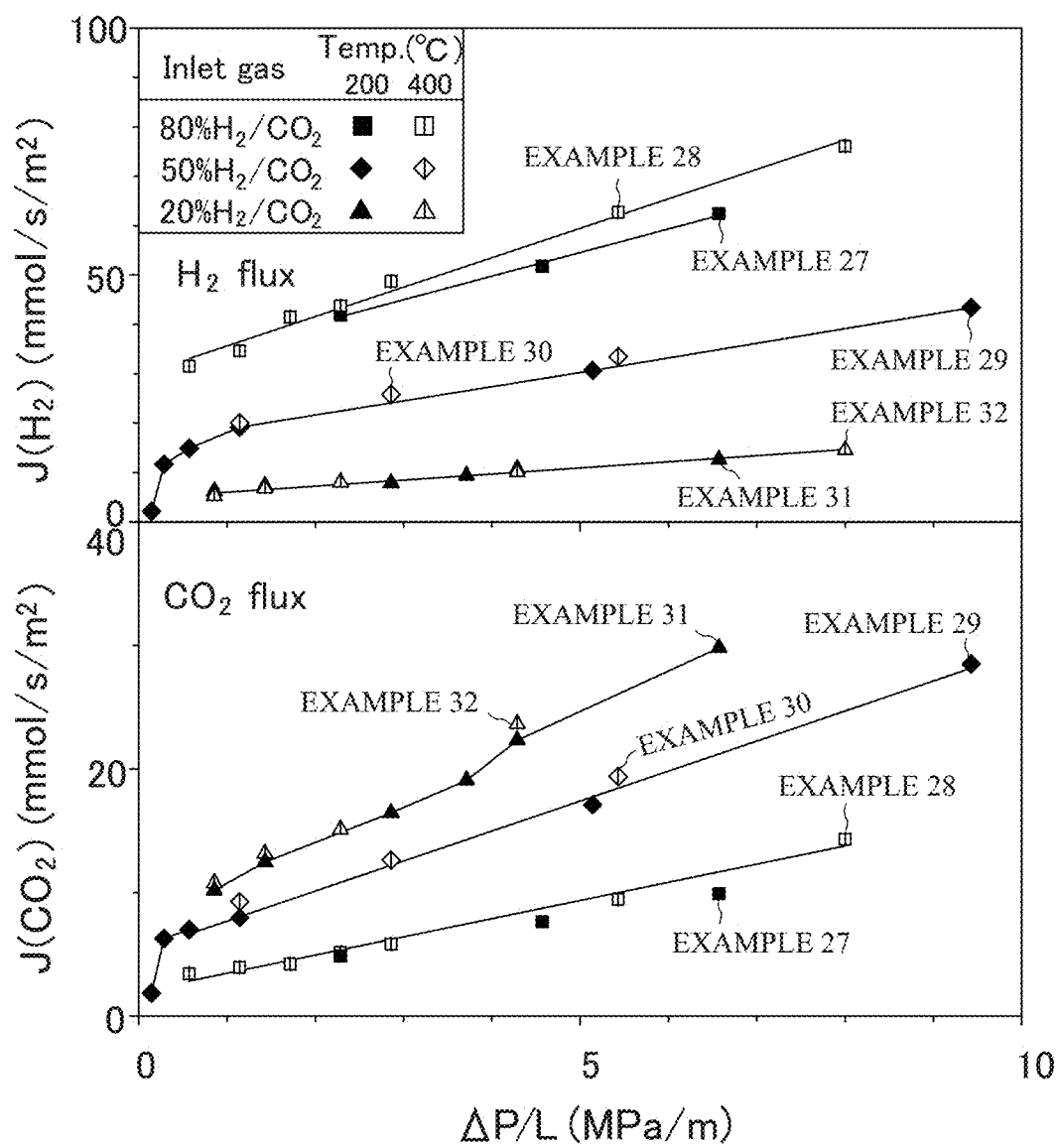
FIG. 16 is a graph depicting results of permeate gas flux measurements concerning hydrogen gas and carbon dioxide gas in a case in which hydrogen gas concentration was performed by using a more dense alumina porous body under temperature environments at 200° C. or higher.

FIG. 16 depicts a graph obtained by plotting measurement results of permeate gas fluxes regarding Examples 27 to 32. Similarly to the results depicted in FIG. 14, the permeate gas fluxes of both of the hydrogen gas and the carbon dioxide gas did not exhibit a critical pressure gradient that was an intercept with respect to the horizontal axis. Additionally, both of the hydrogen gas and the carbon dioxide gas had almost the same tendency as to permeate gas flux fluctuation at environmental temperatures of 200° C. and 400° C. In other words, in both of the hydrogen gas and the carbon dioxide gas, the permeate gas flux increased when the pressure gradient increased.

Figure 17:
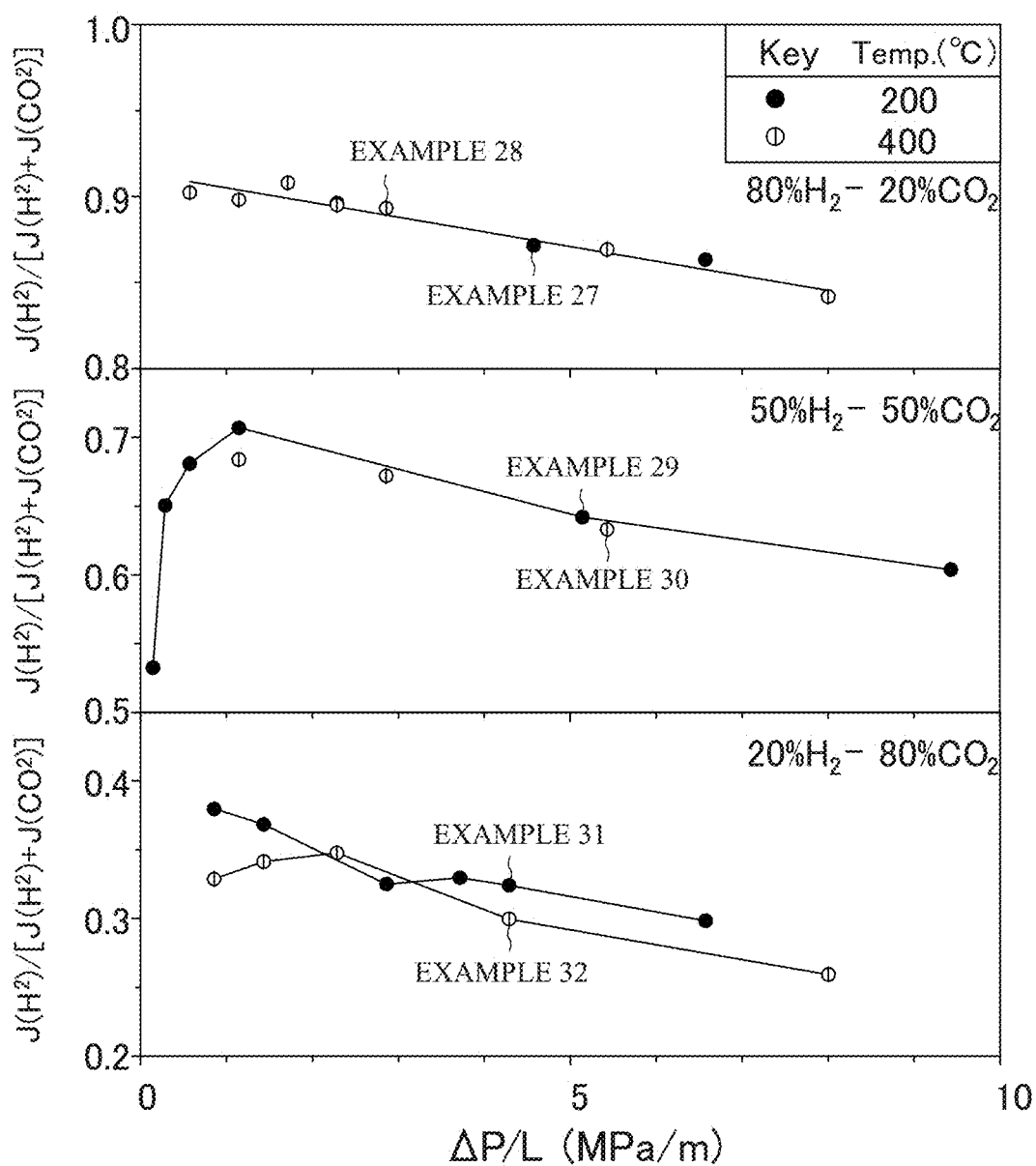
FIG. 17 is a graph depicting separation coefficients of the hydrogen gas obtained from the measurement results of FIG. 16.

FIG. 17 depicts a graph obtained by plotting measurement results of the separation coefficient $F(H_2)$ of hydrogen gas regarding Examples 27 to 32. The upper-stage graph represents results at a hydrogen gas level of 80% by mole in the mixed gas supplied from the mixed gas source 600 (Examples 27 and 28); the middle graph represents results at a hydrogen gas level of 50% by mole (Examples 29 and 30); and the lower-stage graph represents results at a hydrogen gas level of 20% by mole (Examples 31 and 32). The horizontal axis common to each graph represents the pressure gradient $\Delta P/L$.

Measurements of the separation coefficient $F(H_2)$ in Examples 27 to 32 were performed in a region with lower pressure gradients than in Examples 19 to 26 depicted in FIG. 15. At the environmental temperatures of 200° C. and 400° C., fluctuation of the separation coefficient $F(H_2)$ showed almost the same tendency. In other words, the separation coefficient $F(H_2)$ increased as the pressure gradient decreased.

Figure 18:
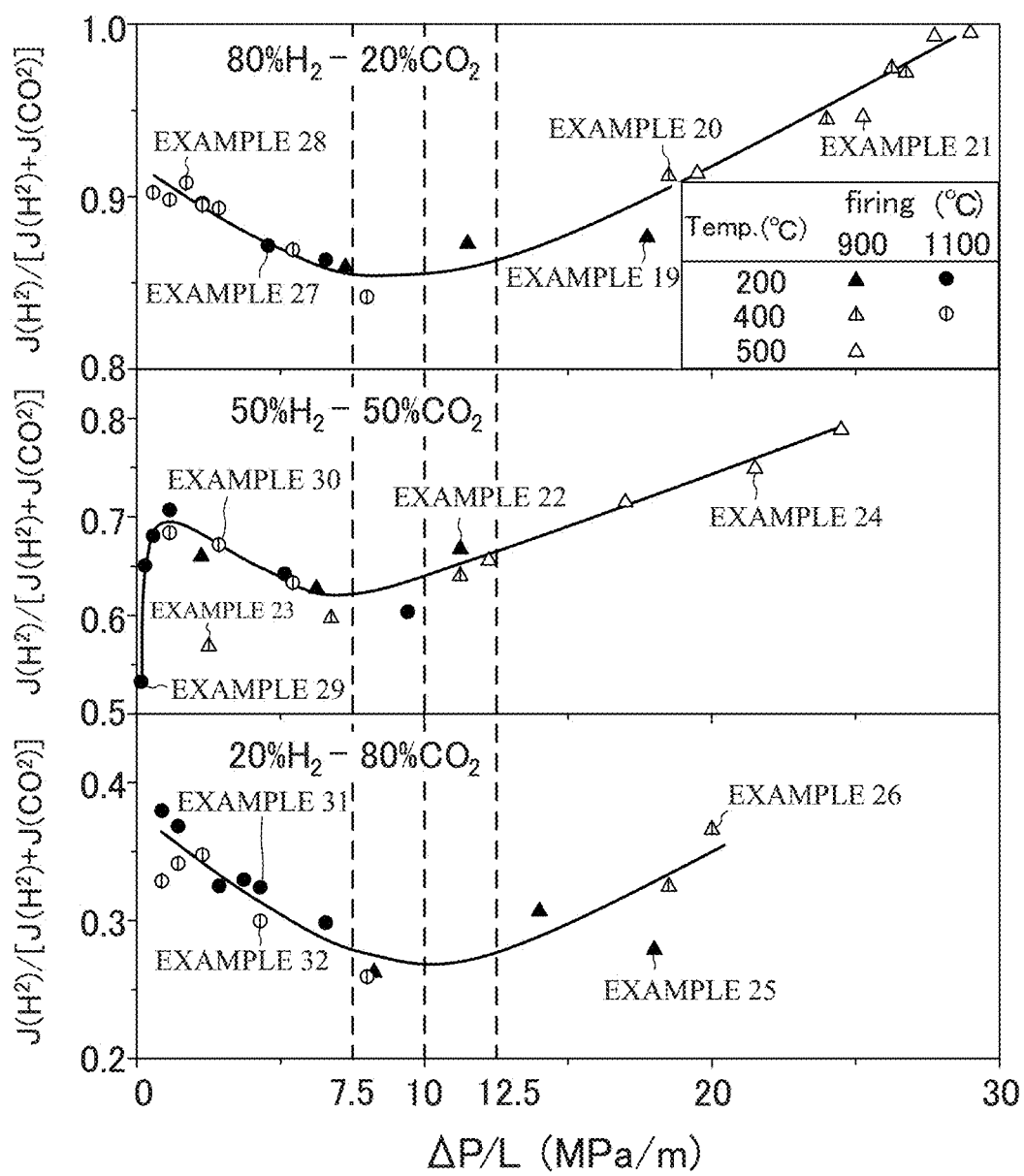
FIG. 18 is a graph depicting together the separation coefficients of the hydrogen gas depicted in FIG. 15 and FIG. 17.

FIG. 18 depicts a graph obtained by plotting the separation coefficients $F(H_2)$ depicted in FIG. 15 and FIG. 17 on the same graph and curvilinearly approximating plot fluctuations. The upper-stage graph represents results at a hydrogen gas level of 80% by mole in the mixed gas supplied from the mixed gas source 600; the middle graph represents results at a hydrogen gas level of 50% by mole; and the lower-stage graph represents results at a hydrogen gas level of 20% by mole. The horizontal axis common to each graph represents the pressure gradient $\Delta P/L$.

Regardless of porosity of the used porous body, that is, regardless of whether the molded body sintering temperature in producing the porous body is 900° C. or 1100° C., the fluctuations of the separation coefficient $F(H_2)$ exhibit the same tendency.

Specifically, in regions with pressure gradients more than 0 MPa/m and not more than 7.5 MPa/m, the separation coefficient $F(H_2)$ tends to increase as the pressure gradient decreases. In other words, similarly to the cases of the temperature environment at room temperature (see FIG. 6 and FIG. 12), the separation coefficient $F(H_2)$ obtained is more favorable as the pressure gradient of the region is lower. Thus, the effect that limiting the pressure gradient to low enables full exhibition of the hydrogen gas concentration function of the porous body was found not to depend on environmental temperature.

On the other hand, in a region where the pressure gradient is 10 MPa/m or more, and more specifically, 12.5 MPa/m or more, the separation coefficient $F(H_2)$ tends to increase as the pressure gradient increases. In other words, in this region, a more favorable separation coefficient $F(H_2)$ is obtained as the pressure gradient becomes larger. The tendency is a phenomenon unique to cases under high temperature environments of 200° C. or higher, which is not observed in the experimental results at room temperature (see FIG. 6 and FIG. 12). Under high temperature, even if the mixed gas is caused to flow into the porous body at high inflow pressure, the porous body can fully exhibit the hydrogen gas concentration function, and a favorable separation coefficient $F(H_2)$ can be obtained, so that hydrogen gas concentration can be efficiently performed. Accordingly, from the viewpoint of industrial use, hydrogen gas concentration under high temperature can be said to be particularly desirable.

Additionally, the tendency that the separation coefficient $F(H_2)$ increases along with increase in the pressure gradient is more noticeable as the hydrogen gas level in the mixed gas is higher. Thus, to efficiently perform hydrogen gas concentration, the hydrogen gas level in the mixed gas is preferably 50% by mole or more, and more preferably 80% by mole or more.

Examples 19 to 32 above performed hydrogen gas concentration under the temperature environment at 200° C. or higher by heating the gas flow channel 500 and the porous body 400 in the electric furnace 800 as the heater. However, note that, without directly heating the gas flow channel 500 and the porous body 400, heating the mixed gas by the heater enables hydrogen gas concentration under a temperature environment at 200° C. or higher. In other words, the gas flow channel 500 and the porous body 400 can be heated indirectly by the mixed gas. Alternatively, the mixed gas, the gas flow channel 500, and the porous body 400 may be heated directly by the heater.

While the Examples of the present disclosure have been described hereinabove, the present disclosure is not limited thereto. For example, the following modifications can be made.

(1) From the viewpoint of heat resistance and the like, the porous body is preferably formed of a ceramic that is a sintered body obtained by baking and solidifying an inorganic material such as an inorganic compound, a metal, or a semiconductor. Examples of the inorganic material for forming the ceramic include, in addition to the alumina material, the yttria-stabilized zirconia material, and the silicon carbide material used in Examples above, one or a combination of two or more selected from a silica raw material, a boron raw material, a magnesium oxide raw material, a calcium oxide raw material, a zirconia material, a silicon nitride raw material, a steatite raw material, a boron nitride raw material, and the like. For example, as one specific example of the ceramic, a phase-separated glass can be used.

(2) The pore diameter distribution of the porous body is not particularly limited as long as the porous body is permeable to hydrogen gas and to carbon dioxide gas and has the property of being more permeable to hydrogen gas than to carbon dioxide gas.

Herein, "permeable to hydrogen gas and to carbon dioxide gas" means that the porous body does not perform hydrogen gas concentration only by a so-called molecular sieving function. The molecular sieving function refers to a function that allows only hydrogen gas to pass through smaller pores than a molecular diameter of carbon dioxide molecules, for example, pores having a diameter of 0.35 nm or so, and inhibits carbon dioxide gas to pass therethrough. The porous bodies used in respective Examples above have a property of being more permeable to hydrogen gas than to carbon dioxide gas because of characteristics unique to molecules, such as a difference in molecular diameter between hydrogen molecules and carbon dioxide molecules and a difference in mean speed therebetween, in spite of allowing for permeation of both hydrogen gas and carbon dioxide gas.

However, when the pore diameter of the porous body is large, for example, 10 mm or so, the porous body cannot have the property of being permeable to hydrogen gas than to carbon dioxide gas. For example, according to the Examples depicted in FIG. 11, when the D80 was 800 nm or less, and when the D50 was 400 nm or less, the porous bodies were recognized to be able to have the property of being more permeable to hydrogen gas than to carbon dioxide gas.

The foregoing describes some example embodiments for explanatory purposes. Although the foregoing discussion has presented specific embodiments, persons skilled in the art will recognize that changes may be made in form and detail without departing from the broader spirit and scope of the present disclosure. Accordingly, the specification and drawings are to be regarded in an illustrative rather than a restrictive sense. This detailed description, therefore, is not to be taken in a limiting sense, and the scope of the present disclosure is defined only by the included claims, along with the full range of equivalents to which such claims are entitled.

The present application is based upon Japanese Patent Application No. 2015-148955 filed on Jul. 28, 2015. The entire specification, claims, and drawings of the Japanese Patent Application No. 2015-148955 are incorporated herein by reference.

REFERENCE SIGNS LIST

100 Porous body
100a Thin tube
101 Inflow region
102 Outflow region
103 Side surface
104 Gas leakage preventing film
200 Gas flow channel
200a Flow inlet
200b Flow outlet
210 Jig
211, 213, 214, 216 Sealing member
212, 215 Spacer
220 Holding member
221 Male member
222 Female member
300 Mixed gas source
400 Porous body
401 Inflow region
402 Outflow region
403 Side surface
500 Gas flow channel
500a Flow inlet
500b Flow outlet
510 First holding member
511 Male member
512 Female member
520 Second holding member
521 Male member 521a Inner tube
521b Outer tube
522 Female member
522a Inner tube
522b Outer tube
522c Valve
531, 532, 541, 542 Annular sealing member
600 Mixed gas source
700 Inert gas source
800 Electric furnace (heater)

The invention claimed is:

1. A hydrogen gas producing apparatus, comprising:
a porous body that (i) is formed of a ceramic and (ii) has a cumulative pore diameter distribution in which a pore diameter (D80) at a number cumulative frequency of 80% is 800 nm or less, thereby causing the porous body to be permeable to hydrogen gas and to carbon dioxide gas and to have a property of being more permeable to the hydrogen gas than to the carbon dioxide gas;
a gas flow channel that includes a flow inlet at one end thereof and a flow outlet at another end thereof, the porous body being disposed inside the gas flow channel; and
a mixed gas source that causes a mixed gas to flow into the porous body through the flow inlet the mixed gas including the carbon dioxide gas and the hydrogen gas and having a carbon dioxide gas concentration of 50% by mole or less,
wherein
a pressure gradient represented by $(P_1 - P_2)/L$ is 10 MPa/m or less where L represents a length of the porous body in a direction in which the mixed gas permeates, $P_1$ represents an inflow pressure of the mixed gas into the porous body, and $P_2$ represents an outflow pressure from the porous body,
the mixed gas is caused to flow into the porous body under a temperature environment at room temperature.

2. A hydrogen gas producing apparatus, comprising:
a porous body that (i) is formed of a ceramic and (ii) has a cumulative pore diameter distribution in which a pore diameter (D80) at a number cumulative frequency of 80% is 800 nm or less, thereby causing the porous body to be permeable to hydrogen gas and to carbon dioxide gas and to have a property of being more permeable to the hydrogen gas than to the carbon dioxide gas;
a gas flow channel that includes a flow inlet at one end thereof and a flow outlet at another end thereof, the porous body being disposed inside the gas flow channel; and
a mixed gas source that causes a mixed gas to flow into the porous body through the flow inlet, the mixed gas including the carbon dioxide gas and the hydrogen gas; and
a heater to heat at least one of the porous body or the mixed gas,
wherein
a pressure gradient represented by $(P_1 - P_2)/L$ is less than 50 MPa/m where L represents a length of the porous body in a direction in which the mixed gas permeates, $P_1$ represents an inflow pressure of the mixed gas into the porous body, and $P_2$ represents an outflow pressure from the porous body,
the mixed gas is flowed into the porous body under a temperature environment heated to 200° C. or higher by the heater.

3. The hydrogen gas producing apparatus according to claim 2, wherein the mixed gas source causes the mixed gas to flow into the porous body under a condition that the pressure gradient is 7.5 MPa/m or less or 10 MPa/m or more.

4. The hydrogen gas producing apparatus according to claim 1 or 2, wherein the ceramic comprises one or more inorganic materials selected from an alumina material, an yttria-stabilized zirconia material, and a silicon carbide material.

5. A hydrogen gas producing method comprising:
preparing a mixed gas that includes carbon dioxide gas and hydrogen gas and has a carbon dioxide gas concentration of 50% by mole or less; and
causing, under a temperature environment at room temperature, the mixed gas to flow into a porous body that (i) is formed of a ceramic and (ii) is permeable to the hydrogen gas and to the carbon dioxide gas
wherein
the porous body has a cumulative pore diameter distribution in which a pore diameter (D80) at a number cumulative frequency of 80% is 800 nm or less, thereby causing the porous body to have a property of being more permeable to the hydrogen gas than to the carbon dioxide gas,
a pressure gradient represented by $(P_1 - P_2)/L$ is 10 MPa/m or less where L represents a length of the porous body in a direction in which the mixed gas permeates, $P_1$ represents an inflow pressure of the mixed gas into the porous body, and $P_2$ represents an outflow pressure from the porous body.

6. A hydrogen gas producing method comprising:
preparing a mixed gas including carbon dioxide gas and hydrogen gas; and
causing, under a temperature environment at 200° C. or higher, the mixed gas to flow into a porous body that (i) is formed of a ceramic and (ii) is permeable to the hydrogen gas and to the carbon dioxide gas,
wherein
the porous body has a cumulative pore diameter distribution in which a pore diameter (D80) at a number cumulative frequency of 80% is 800 nm or less, thereby causing the porous body to have a property of being more permeable to the hydrogen gas than to the carbon dioxide gas,
a pressure gradient represented by $(P_1 - P_2)/L$ is less than 50 MPa/m where L represents a length of the porous body in a direction in which the mixed gas permeates, $P_1$ represents an inflow pressure of the mixed gas into the porous body, and $P_2$ represents an outflow pressure from the porous body.

* * * * *